United States Patent
Tsukada et al.

(10) Patent No.: US 10,666,838 B2
(45) Date of Patent: May 26, 2020

(54) CONTROL METHOD OF OPERATION APPARATUS CONFIGURED TO CONTROL A PLURALITY OF CONTENT REPRODUCTION APPARATUS TO SET A PRESET SYNCHRONOUS STATE, CONTROL METHOD OF COMMAND PROCESSING APPARATUS, AND CONTROL METHOD OF CONTENT REPRODUCTION SYSTEM

(71) Applicant: YAMAHA CORPORATION, Hamamatsu-shi (JP)

(72) Inventors: Keisuke Tsukada, Hamamatsu (JP); Akihiko Suyama, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/902,059

(22) Filed: Feb. 22, 2018

(65) Prior Publication Data
US 2018/0262657 A1 Sep. 13, 2018

Related U.S. Application Data

(63) Continuation of application No. PCT/JP2017/009589, filed on Mar. 9, 2017.

(51) Int. Cl.
*H04N 5/073* (2006.01)
*G06F 3/16* (2006.01)
(Continued)

(52) U.S. Cl.
CPC ............ *H04N 5/073* (2013.01); *G06F 3/167* (2013.01); *G10L 15/22* (2013.01); *H04N 21/242* (2013.01);
(Continued)

(58) Field of Classification Search
CPC .............. H04N 5/073; H04N 21/4307; H04N 21/4325; H04N 21/242; H04N 21/43615;
(Continued)

(56) References Cited

U.S. PATENT DOCUMENTS 8,788,080 B1 * 7/2014 Kallai ...................... H04R 3/12
700/94
9,078,072 B2 * 7/2015 Sundaresan ......... H04L 43/0829
(Continued)

FOREIGN PATENT DOCUMENTS

JP  2007512718 A  5/2007
JP  2007165961 A  6/2007
(Continued)

OTHER PUBLICATIONS

International Search Report issued in Intl. Appln. No. PCT/JP2017/009589 dated May 30, 2017. Partial English translation provided.
(Continued)

*Primary Examiner* — Jefferey F Harold
*Assistant Examiner* — Humam M Satti
(74) *Attorney, Agent, or Firm* — Rossi, Kimms & McDowell LLP

(57) ABSTRACT

A control method of operation apparatus includes receiving selection of at least one of a plurality of presets, set in advance, regarding a plurality of content reproduction apparatuses, transmitting a synchronous state cancel signal for canceling at least some of the current synchronous states of the plurality of content reproduction apparatuses, and transmitting a preset restoring signal for restoring a preset selected.

19 Claims, 14 Drawing Sheets

|         | MASTER DEVICE | SLAVE DEVICE | CONTENT          | EXTERNAL INPUT |
|---------|---------------|--------------|------------------|----------------|
| Preset1 | 200A          | 200B, 200C   | NETWORK RADIO A  |                |
| Preset2 | 200C          | 200D         | CD               |                |
| Preset3 | 200A          | 200B         | NETWORK RADIO A  |                |
| Preset4 | 200B          | 200C, 200D   |                  | TV             |

(51) Int. Cl.
*H04N 21/43* (2011.01)
*H04N 21/432* (2011.01)
*H04N 21/242* (2011.01)
*H04N 21/436* (2011.01)
*H04N 21/485* (2011.01)
*G10L 15/22* (2006.01)

(52) U.S. Cl.
CPC ..... *H04N 21/4307* (2013.01); *H04N 21/4325* (2013.01); *H04N 21/43615* (2013.01); *H04N 21/485* (2013.01); *G10L 2015/223* (2013.01)

(58) Field of Classification Search
CPC . H04N 21/485; G10L 15/22; G10L 2015/223; G06F 3/167
See application file for complete search history.

(56) References Cited

U.S. PATENT DOCUMENTS

| | | | |
|---|---|---|---|
| D740,787 S | 10/2015 | Jang et al. | |
| D758,354 S | 6/2016 | Jang et al. | |
| D758,994 S | 6/2016 | Jang et al. | |
| D759,069 S | 6/2016 | Sakalowsky et al. | |
| 9,495,076 B2 * | 11/2016 | Kumar | H04L 12/6418 |
| 10,499,146 B2 * | 12/2019 | Lang | G10L 15/22 |
| 2004/0258259 A1 * | 12/2004 | Koyama | H04R 5/04 |
| | | | 381/307 |
| 2007/0038999 A1 | 2/2007 | Millington | |
| 2008/0147397 A1 * | 6/2008 | Konig | G10L 15/22 |
| | | | 704/246 |
| 2009/0171487 A1 * | 7/2009 | Wilhelm | G11B 27/10 |
| | | | 700/94 |
| 2012/0250640 A1 * | 10/2012 | Wakamatsu | H04N 21/4302 |
| | | | 370/329 |
| 2014/0183962 A1 * | 7/2014 | Qian | H02J 7/025 |
| | | | 307/104 |
| 2014/0277639 A1 | 9/2014 | Gomes-Casseres et al. | |
| 2014/0277644 A1 | 9/2014 | Gomes-Casseres et al. | |
| 2014/0277651 A1 | 9/2014 | Gomes-Casseres et al. | |
| 2015/0094834 A1 * | 4/2015 | Vega | H04N 21/8106 |
| | | | 700/94 |
| 2015/0100623 A1 | 4/2015 | Gudell et al. | |
| 2016/0073197 A1 * | 3/2016 | Hammer | H04W 12/04 |
| | | | 381/80 |
| 2016/0110156 A1 * | 4/2016 | Kusano | G05B 15/02 |
| | | | 700/94 |
| 2016/0210114 A1 | 7/2016 | Gomes-Casseres et al. | |
| 2016/0291925 A1 | 10/2016 | Kohara et al. | |
| 2017/0312626 A1 * | 11/2017 | Colenbrander | A63F 13/355 |

FOREIGN PATENT DOCUMENTS

| | | |
|---|---|---|
| JP | 2011118290 A | 6/2011 |
| JP | 2015100085 A | 5/2015 |
| JP | 2016520850 A | 7/2016 |
| JP | 2017502363 A | 1/2017 |

OTHER PUBLICATIONS

Written Opinion issued in Intl. Appln. No. PCT/JP2017/009589 dated May 30, 2017. Partial English translation provided.
Office Action issued in Japanese Appln. No. 2019-504246 dated Nov. 26, 2019. English machine translation provided.

* cited by examiner

| | MASTER DEVICE | SLAVE DEVICE | CONTENT | EXTERNAL INPUT |
|---|---|---|---|---|
| Preset1 | 200A | 200B, 200C | NETWORK RADIO A | |
| Preset2 | 200C | 200D | CD | |
| Preset3 | 200A | 200B | NETWORK RADIO A | |
| Preset4 | 200B | 200C, 200D | | TV |

| | MASTER DEVICE | SLAVE DEVICE | CONTENT | EXTERNAL INPUT |
|---|---|---|---|---|
| Preset1 | 200A | 200B, 200C | NETWORK RADIO A | |
| Preset2 | 200C | 200D | CD | |
| Preset3 | 200A | 200B | NETWORK RADIO A | |
| Preset4 | 200B | 200C, 200D | | TV |

CONTROL METHOD OF OPERATION APPARATUS CONFIGURED TO CONTROL A PLURALITY OF CONTENT REPRODUCTION APPARATUS TO SET A PRESET SYNCHRONOUS STATE, CONTROL METHOD OF COMMAND PROCESSING APPARATUS, AND CONTROL METHOD OF CONTENT REPRODUCTION SYSTEM

CROSS-REFERENCE TO RELATED APPLICATION

The present application is continuation of International Application No. PCT/JP2017/009589 filed on Mar. 9, 2017. The contents of the application are hereby incorporated by reference into this application.

BACKGROUND OF THE INVENTION

Field of the Invention

The present invention relates an operation apparatus, a command processing apparatus, and a content reproduction system.

Background Art

JP 2016-520850 discloses a technique of starting streaming of predetermined content by using presets in an audio reproduction apparatus included in an audio system, and a technique of copying the presets and updating preset data with respect to another audio reproduction apparatus synchronized with the audio reproduction apparatus.

However, in the configuration of the related art, among a plurality of audio reproduction apparatuses included in the audio system, a user is required to set which audio reproduction apparatuses are in a synchronous state and which audio reproduction apparatus is in an asynchronous state every time, and thus convenience deteriorates.

SUMMARY OF THE INVENTION

The present disclosure has been made in light of the problem, and an object thereof is to improve convenience of a content reproduction system including a plurality of content reproduction apparatuses.

According to an aspect of the present disclosure, there is provided an operation apparatus including a communication unit that is connectable to a plurality of content reproduction apparatuses via a network; an input unit that receives selection of at least one of a plurality of presets, set in advance, regarding the plurality of content reproduction apparatuses; and a control unit that transmits a synchronous state cancel signal for canceling at least some of the current synchronous states of the plurality of content reproduction apparatuses, and transmits a preset restoring signal for restoring a preset selected in the input unit.

According to another aspect of the present disclosure, there is provided a command processing apparatus including a communication unit that is connectable to a plurality of content reproduction apparatuses via a network; and a control unit that acquires voice data for giving an instruction for selection of at least one of a plurality of presets, set in advance, regarding the plurality of content reproduction apparatuses, transmits a synchronous state cancel signal for canceling at least some of the current synchronous states of the plurality of content reproduction apparatuses, and transmits a preset restoring signal for restoring a preset selected in the voice data.

According to still another aspect of the present disclosure, there is provided a content reproduction system including a voice input apparatus that generates voice data; and a command processing apparatus that includes a communication unit which is connectable to a plurality of content reproduction apparatuses via a network, and a control unit which acquires the voice data for giving an instruction for selection of at least one of a plurality of presets, set in advance, regarding the plurality of content reproduction apparatuses, transmits a synchronous state cancel signal for canceling at least some of the current synchronous states of the plurality of content reproduction apparatuses, and transmits a preset restoring signal for restoring a preset selected in the voice data.

According to still another aspect of the present disclosure, there is provided a control method for an operation apparatus including receiving selection of at least one of a plurality of presets, set in advance, regarding a plurality of content reproduction apparatuses which are connectable to each other via a network; transmitting a synchronous state cancel signal for canceling at least some of the current synchronous states of the plurality of content reproduction apparatuses; and transmitting a preset restoring signal for restoring the selected preset.

DETAILED DESCRIPTION OF THE INVENTION

First Embodiment

Hereinafter, a first embodiment of the present disclosure will be described with reference to the drawings.

Content Reproduction System 1000

Figure 1:
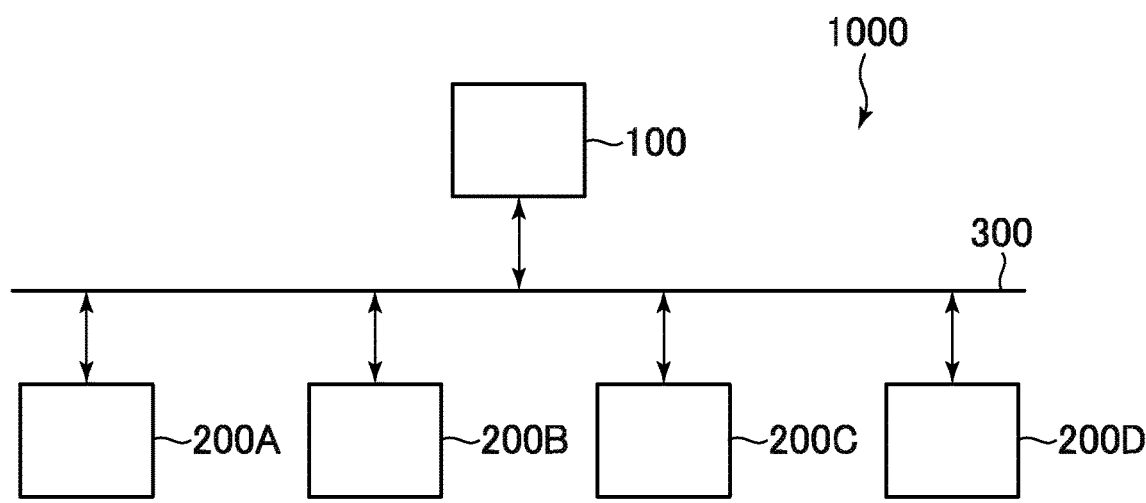
FIG. 1 is a schematic diagram of a content reproduction system according to a first embodiment.

FIG. 1 is a schematic diagram of a content reproduction system 1000 according to the present embodiment.

The content reproduction system 1000 includes an operation apparatus 100, a first content reproduction apparatus 200A, a second content reproduction apparatus 200B, a third content reproduction apparatus 200C, and a fourth content reproduction apparatus 200D. The first content reproduction apparatus 200A, the second content reproduction apparatus 200B, the third content reproduction apparatus 200C, and the fourth content reproduction apparatus 200D are content reproduction apparatuses which are connectable to a network 300, and the operation apparatus 100 can transmit command signals to the first content reproduction apparatus 200A, the second content reproduction apparatus 200B, the third content reproduction apparatus 200C, and the fourth content reproduction apparatus 200D via the network 300.

The content in the present disclosure includes, for example, a video, a sound, and text.

In the present disclosure, as an example, the content reproduction system 1000 is configured to include four content reproduction apparatuses, but the number of content reproduction apparatuses is not limited to four.

Network 300

The network 300 includes a wireless local area network (LAN) such as a Wireless-Fidelity (Wi-Fi; registered trademark), a wired LAN, a wide area network (WAN), and the like, and is used as a signal transmission path among the operation apparatus 100, the first content reproduction apparatus 200A, the second content reproduction apparatus 200B, the third content reproduction apparatus 200C, and the fourth content reproduction apparatus 200D.

Operation Apparatus 100

The operation apparatus 100 is a computer such as a smart phone, a tablet computer, a personal computer, or a dedicated controller, and an apparatus which is connectable to the network 300 and can transmit command signals to the first content reproduction apparatus 200A, the second content reproduction apparatus 200B, the third content reproduction apparatus 200C, and the fourth content reproduction apparatus 200D.

The operation apparatus 100 is a computer which executes a synchronous state acquisition step S101, a synchronous state comparison step S102, a synchronous state cancel step S103, and a preset restoring step S104 which will be described later on the basis of a program. The program may be installed from various recording media such as an optical medium or a magnetic medium, and may be downloaded via the Internet.

Figure 2:
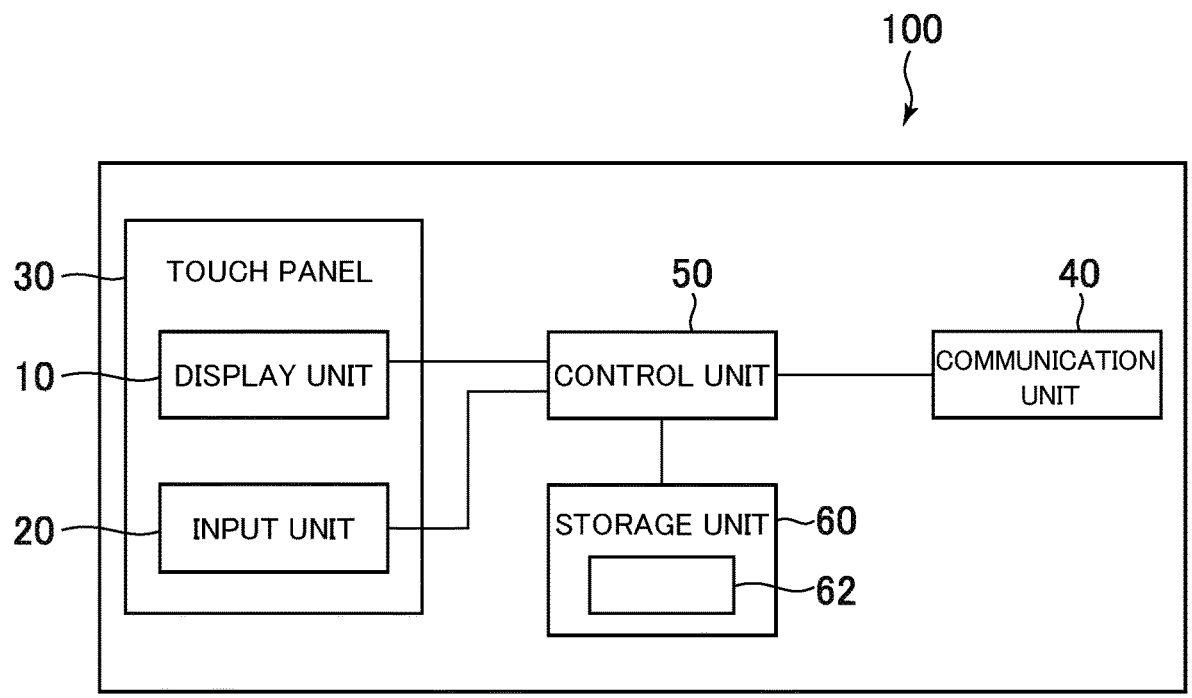
FIG. 2 is a block diagram illustrating an operation apparatus according to the first embodiment.

FIG. 2 is a block diagram illustrating the operation apparatus 100 according to the present embodiment. As illustrated in FIG. 2, the operation apparatus 100 includes a display unit 10 on which a user interface is displayed, and an input unit 20 used for a user to perform an input operation according to the displayed user interface. In the present embodiment, the operation apparatus 100 is configured to be provided with a touch panel 30 including the display unit 10 and the input unit 20. The operation apparatus 100 includes a communication unit 40 which is connected to the network 300, and transmits command signals to the first content reproduction apparatus 200A, the second content reproduction apparatus 200B, the third content reproduction apparatus 200C, and the fourth content reproduction apparatus 200D, a control unit 50 which controls the entire operation apparatus 100, and a storage unit 60 which stores a program 62 used for the control unit 50 to perform various pieces of control.

Communication Unit 40

The communication unit 40 transmits command signals generated by the control unit 50 to the first content reproduction apparatus 200A, the second content reproduction apparatus 200B, the third content reproduction apparatus 200C, and the fourth content reproduction apparatus 200D via the network 300. The communication unit 40 acquires information regarding ON and OFF states of power sources of the first content reproduction apparatus 200A, the second content reproduction apparatus 200B, the third content reproduction apparatus 200C, and the fourth content reproduction apparatus 200D, and acquires current synchronous states of the first content reproduction apparatus 200A, the second content reproduction apparatus 200B, the third content reproduction apparatus 200C, and the fourth content reproduction apparatus 200D.

Control Unit 50

The control unit 50 includes a processor and a memory, and controls operations of the touch panel 30 including the display unit 10 and the input unit 20, the communication unit 40, and the storage unit 60 on the basis of the program 62 stored in the storage unit 60.

In a case where the information regarding the ON and OFF states of the power sources and the current synchronous states of the first content reproduction apparatus 200A, the second content reproduction apparatus 200B, the third content reproduction apparatus 200C, and the fourth content reproduction apparatus 200D is acquired via the communication unit 40, the control unit 50 transmits the information regarding the states to the display unit 10 and instructs the display unit 10 to display the information thereon.

In a case where the user selects one of a plurality of presets registered in advance in the storage unit 60 by operating the input unit 20, the control unit 50 generates a synchronous state cancel signal. Here, the preset indicates reproduction situations or the like set for the plurality of content reproduction apparatuses in advance, and includes details of content to be reproduced or previous settings regarding synchronous states of the plurality of content reproduction apparatuses. The number of content reproduction apparatuses included in the preset is not limited to plural, and the preset may include previous settings regarding reproduction situations of a single content reproduction apparatus. In other words, selection of the preset also includes selection for causing a certain content reproduction apparatus included in the preset not to be synchronized with other content reproduction apparatuses. The synchronous state cancel signal is a signal for giving an instruction for canceling the current synchronous state to the first content reproduction apparatus 200A, the second content reproduction apparatus 200B, the third content reproduction apparatus 200C, and the fourth content reproduction apparatus 200D. The control unit 50 generates a preset restoring signal for restoring the selected preset. In a case where the synchronous state cancel signal and the preset restoring signal are generated, the control unit 50 transmits the signals to the first content reproduction apparatus 200A, the second content reproduction apparatus 200B, the third content reproduction apparatus 200C, and the fourth content reproduction apparatus 200D via the communication unit 40.

The control unit 50 may transmit the synchronous state cancel signal to the content reproduction apparatuses before generating the preset restoring signal.

When the synchronous state cancel signal or the preset restoring signal is transmitted, the control unit 50 may add a user ID to the signal on the basis of the user's login situation to the operation apparatus 100, and may transmit the signal.

Storage Unit 60

The storage unit 60 is realized by, for example, a hard disk drive (HDD). Various recording media including a solid-state memory such as a flash memory, a memory card having a solid-state memory built thereinto, an optical disc, a magnetooptical disc, and a hologram memory may be used, and the storage unit 60 may be configured to be able to perform recording and reproduction according to a recording medium to be used. The program 62 used by the control unit 50 is stored in the storage unit 60.

As described above, the storage unit 60 stores a plurality of presets, and the presets include, for example, information regarding synchronous states set in advance, information regarding content to be reproduced, and information regarding an external input in a case where the external input is used.

Touch Panel 30

The display unit 10 included in the touch panel 30 displays the information regarding ON and OFF states of the power sources and the current synchronous states of the first content reproduction apparatus 200A, the second content reproduction apparatus 200B, the third content reproduction apparatus 200C, and the fourth content reproduction apparatus 200D in response to an instruction from the control unit 50.

Figure 3:
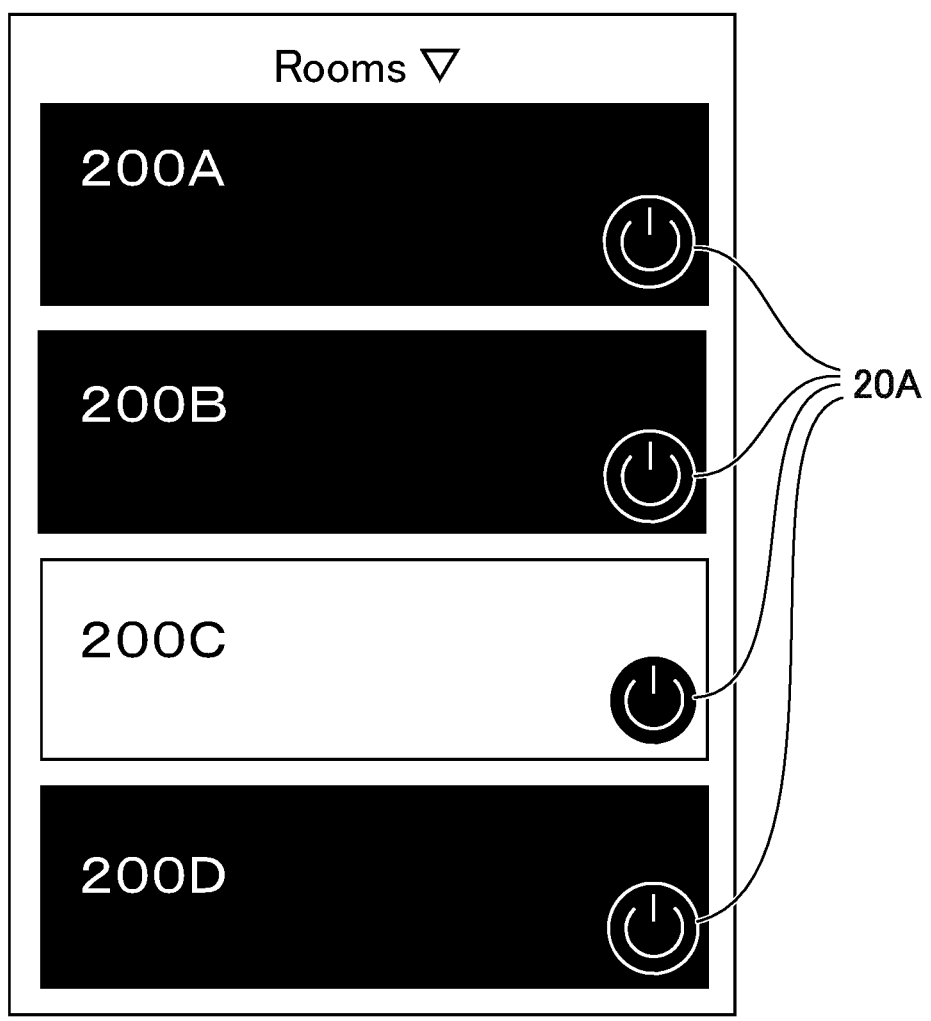
FIG. 3 is a schematic diagram of a user interface displayed by the operation apparatus and a display unit of a voice input apparatus according to the present disclosure.

FIG. 3 is a schematic diagram of a user interface displayed on the display unit 50 according to the present embodiment. In the example illustrated in FIG. 3, the first content reproduction apparatus 200A, the second content reproduction apparatus 200B, the third content reproduction apparatus 200C, and the fourth content reproduction apparatus 200D are disposed in different rooms, and, for example, pictures of the respective content reproduction apparatuses and the names of the content reproduction apparatuses are displayed on a room selection screen displayed as "Rooms". The pictures of the content reproduction apparatuses are not illustrated in FIG. 3. As illustrated in FIG. 3, information display fields regarding the first content reproduction apparatus 200A, the second content reproduction apparatus 200B, and the fourth content reproduction apparatus 200D are displayed to be dark as a whole, and thus indicate that the power sources of the content reproduction apparatuses are in an OFF state. As illustrated in FIG. 3, an information display field regarding the third content reproduction apparatus 200C is displayed to be bright as a whole, and indicates that the power source thereof is in an ON state.

A power source ON/OFF control button 20A is displayed on a right end of the display of each of the first content reproduction apparatus 200A, the second content reproduction apparatus 200B, the third content reproduction apparatus 200C, and the fourth content reproduction apparatus 200D. In a case where the user touches the power source ON/OFF control button, the operation apparatus 100 transmits a command signal for bringing a content reproduction apparatus currently in an OFF state into an ON state to the content reproduction apparatus, and transmits a command signal for bringing a content reproduction apparatus currently in an ON state into an OFF state to the content reproduction apparatus. The power source ON/OFF control button 20A forms a part of the input unit 20 included in the touch panel 30.

Figure 4:
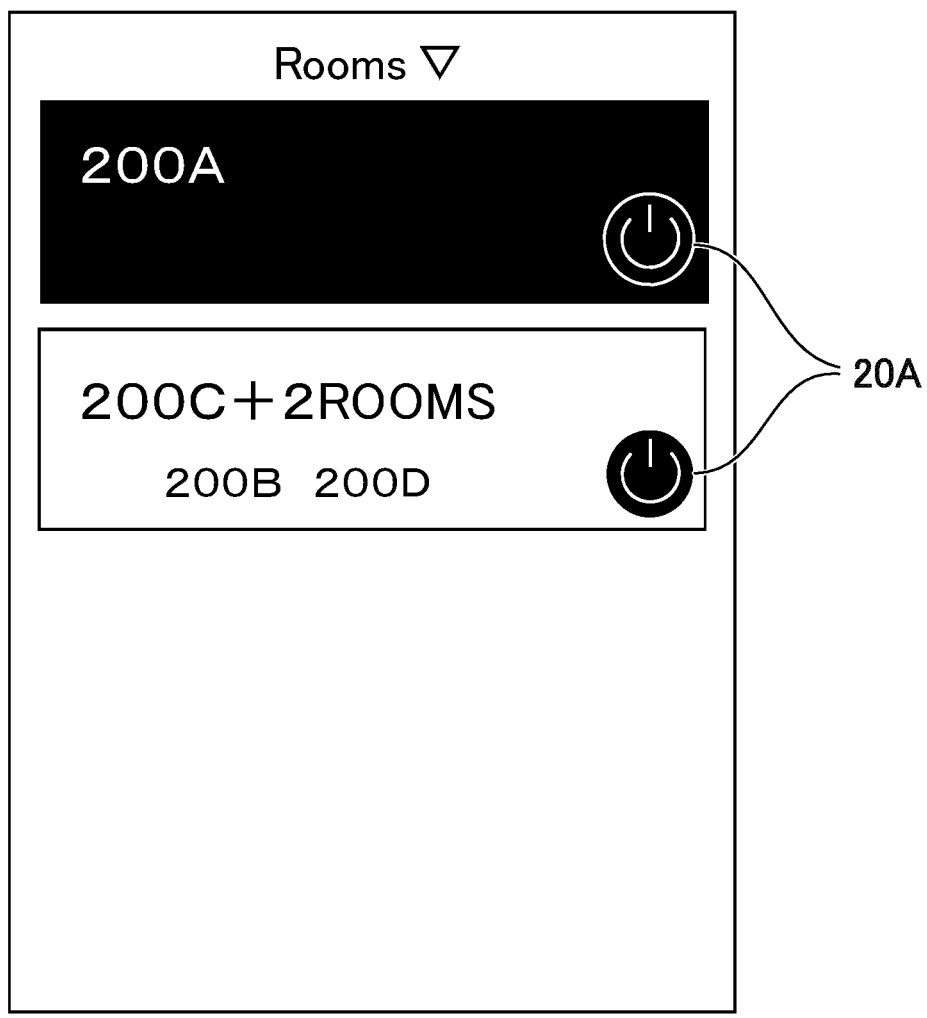
FIG. 4 is a schematic diagram of a user interface displayed by the operation apparatus and the display unit of the voice input apparatus according to the present disclosure.

FIG. 4 is a schematic diagram of a user interface displayed on the display unit 10 according to the present embodiment, and illustrates an example of displaying a state in which a synchronous state is built with the third content reproduction apparatus 200C as a master device and with the second content reproduction apparatus 200B and the fourth content reproduction apparatus 200D as slave devices. As illustrated in FIG. 4, an information display field regarding the third content reproduction apparatus 200C displays "200C+2Rooms", and indicates that the content reproduction apparatuses disposed in two other rooms are synchronized with the third content reproduction apparatus 200C. The information display field displays "200B" and "200D", and indicates that the second content reproduction apparatus 200B and the fourth content reproduction apparatus 200D are included as slave devices of the third content reproduction apparatus 200C.

First Content Reproduction Apparatus 200A

Figure 5:
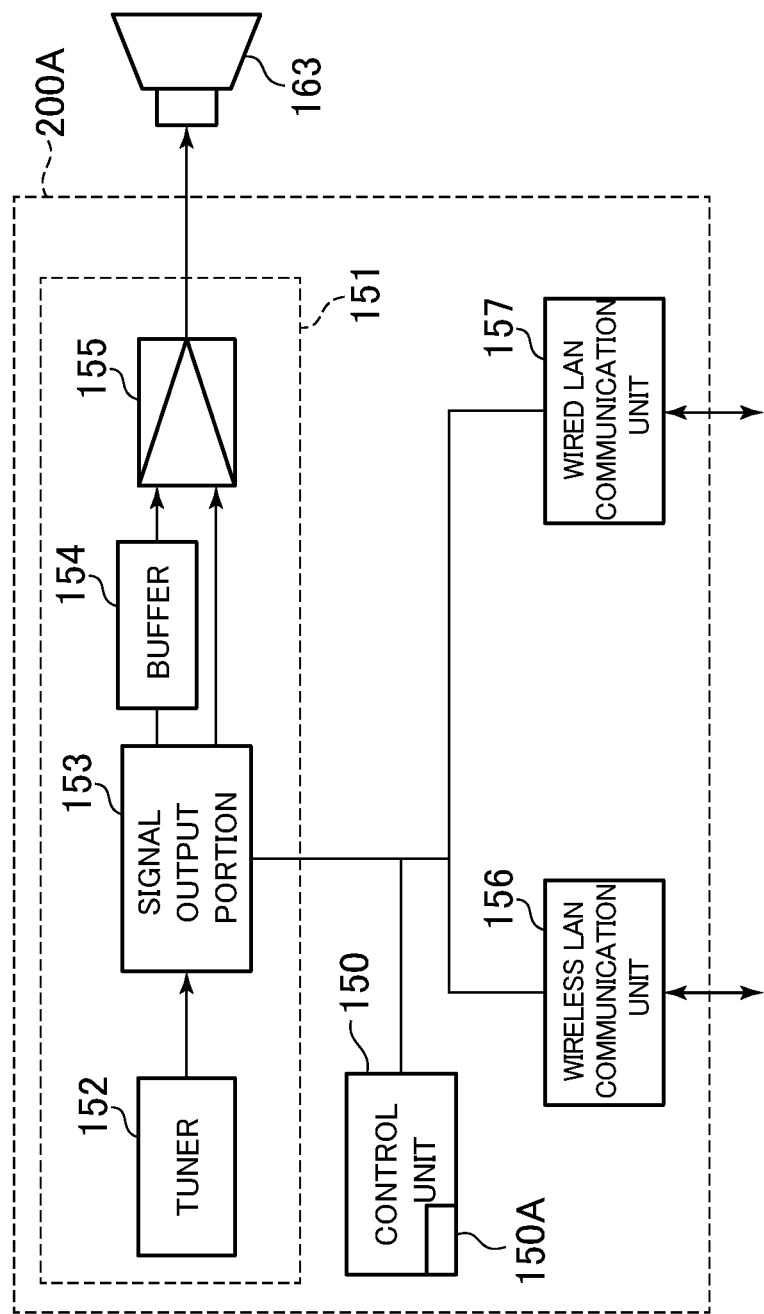
FIG. 5 is a block diagram illustrating a first content reproduction apparatus according to the present embodiment.

Next, with reference to FIG. 5, the first content reproduction apparatus 200A will be described. FIG. 5 is a block diagram of the first content reproduction apparatus 200A of the content reproduction system 1000 according to the present embodiment.

As illustrated in FIG. 5, the first content reproduction apparatus 200A is an audio apparatus reproducing the audio or a video reproduction apparatus reproducing the video content such as a video, and includes a control unit 150, a content processing unit 151, a wireless LAN communication unit 156, and a wired LAN communication unit 157, and the content processing unit 151 is connected to a speaker 163. The content processing unit 151 may be configured to include the speaker 163.

The control unit 150 includes a CPU and a memory, and stores a content reproduction program 150A. The content reproduction program 150A may be installed from various recording media such as an optical medium or a magnetic medium, and may be downloaded via the Internet. The control unit 150 controls operations of the content processing unit 151, the wireless LAN communication unit 156, and the wired LAN communication unit 157 on the basis of the content reproduction program 150A. The control unit 150 performs transmission and reception of signals with the operation apparatus 100 and the other content reproduction apparatuses via the network 300.

The memory of the control unit 150 is, for example, an EEPROM, and stores list information of a "favorite" which is a shortcut of the content registered by the user, or a link destination of a shortcut registered in the favorite.

The wireless LAN communication unit 156 performs wireless communication with the operation apparatus 100 and other content reproduction apparatuses (the second content reproduction apparatus 200B, the third content reproduction apparatus 200C, the fourth content reproduction apparatus 200D, and the like).

The wired LAN communication unit 157 has a cable connector, and performs wired communication with the operation apparatus 100 and other content reproduction apparatuses (the second content reproduction apparatus 200B, the third content reproduction apparatus 200C, the fourth content reproduction apparatus 200D, and the like).

The content processing unit 151 includes a tuner 152, a signal output portion 153, a buffer 154, and a power amplifier 155. The tuner 152 receives a content source of the content from an FM broadcast or the like, and inputs the content source to the signal output portion 153. The control unit 150 receives a content source of network radio content or the like from the network 300 via either one of the wireless LAN communication unit 156 or the wired LAN communication unit 157, and inputs the content source to the signal output portion 153.

The signal output portion 153 reproduces the content on the basis of the input content source. The signal output portion 153 reproduces the content by using the buffer 154 or without using the buffer 154. When the content is reproduced, whether or not the signal output portion 153 uses the buffer 154 is determined depending on whether the first content reproduction apparatus 200A is a master device or a slave device with respect to other synchronized content reproduction apparatuses. Details thereof will be described later.

The signal output portion 153 generates a streaming signal by using the content source in response to an instruction from the control unit 150, and outputs the streaming signal to the wireless LAN communication unit 156 or the wired LAN communication unit 157. The signal output portion 153 may acquire streaming signals generated by other content reproduction apparatuses and transmitted via the wireless LAN communication unit 156 or the wired LAN communication unit 157, and may output the streaming signals.

The buffer 154 delays reproduction of the content in the signal output portion 153 by a predetermined time, so as to synchronize reproduction in the first content reproduction apparatus 200A with reproduction in other content reproduction apparatuses. The delay time is set according to a communication time of streaming signals between the first content reproduction apparatus 200A and other content reproduction apparatuses.

The power amplifier 155 amplifies input content signals, and outputs the amplified content signals to the externally connected speaker 163. The speaker 163 outputs the content signals amplified by the power amplifier 155 as sounds.

Configurations of the second content reproduction apparatus 200B, the third content reproduction apparatus 200C, and the fourth content reproduction apparatus 200D are assumed to be the same as the configuration of the first content reproduction apparatus 200A, and thus a description thereof will be omitted.

Synchronous Reproduction Method in Content Reproduction Apparatuses

Hereinafter, a description will be made of a synchronous reproduction method among a plurality of content reproduction apparatuses. In the present embodiment, it is assumed that the user sets the first content reproduction apparatus 200A as a master device, and sets the second content reproduction apparatus 200B as a slave device thereof, by using the operation apparatus 100.

Next, the user selects a service type desired to be used by the user on a content selection screen displayed on the display unit 10 of the operation apparatus 100 by using the operation apparatus 100. In a case where the user selects desired content on the content selection screen displayed on the operation apparatus 100, a reproduction instruction signal for instructing the content to be reproduced is transmitted to the first content reproduction apparatus 200A which is a master device from the operation apparatus 100 via the network 300.

In the present embodiment, as an example, a description will be made of a case where a content source of the content selected by the user can be acquired from a network radio. In the first content reproduction apparatus 200A having received the reproduction instruction signal, the control unit 150 acquires a content source via the wireless LAN communication unit 156 in order to reproduce the content selected by the user.

In the first content reproduction apparatus 200A having acquired the content source, the signal output portion 153 generates a streaming signal on the basis of the content source. The first content reproduction apparatus 200A delivers the streaming signal to the second content reproduction apparatus 200B via the network 300. In the second content reproduction apparatus 200B, the control unit 150 receives the streaming signal via the wireless LAN communication unit 156. The control unit 150 instructs the signal output portion 153 to output the streaming signal of the content.

Here, delay occurs due to the streaming signal generated by the first content reproduction apparatus 200A being transmitted to the second content reproduction apparatus 200B from the first content reproduction apparatus 200A via the network 300. Thus, the signal output portion 153 of the first content reproduction apparatus 200A reproduces the content via the buffer 154. On the other hand, the signal output portion 153 of the second content reproduction apparatus 200B reproduces the content by outputting the streaming signal of the content to the power amplifier 155 without using the buffer 154. In other words, the first content reproduction apparatus 200A which is a master device reproduces the content via the buffer 154, and the second content reproduction apparatus 200B which is a slave device reproduces the content without using the buffer 154. In the above-described way, the delay occurring due to the streaming signal being transmitted from the first content reproduction apparatus 200A to the second content reproduction apparatus 200B can be canceled out by delay due to the content being reproduced via the buffer 154 in the first content reproduction apparatus 200A. Thus, the first content reproduction apparatus 200A and the second content reproduction apparatus 200B can perform synchronous reproduction.

In the present operation, the second content reproduction apparatus 200B is configured to reproduce the content without using the buffer 154, but the second content reproduction apparatus 200B may reproduce the content via the buffer 154. In other words, a difference between a delay time due to the buffer 154 in the first content reproduction apparatus 200A and a delay time due to the buffer 154 in the second content reproduction apparatus 200B may be adjusted, so that the first content reproduction apparatus 200A and the second content reproduction apparatus 200B can perform synchronous reproduction.

In the above description, a description has been made of an example in which a synchronous state among a plurality of content reproduction apparatuses is formed by a master device delivering a streaming signal of the content to a slave device, but, in a case where a plurality of content reproduction apparatuses hold the content to be reproduced, there may be a configuration in which an instruction for reproduction of the content is directly given to the plurality of content reproduction apparatuses from the operation apparatus 100, and thus a synchronous state among the plurality of content reproduction apparatuses are formed.

The synchronous state in the present disclosure is not limited to a state in which content reproduction timings completely match each other among a plurality of content reproduction apparatuses, and also includes a state in which slight delay occurs due to network delay or the like in one content reproduction apparatus and thus a reproduction timing is slightly deviated.

Control Method for Content Reproduction System 1000

Figures 6, 7:
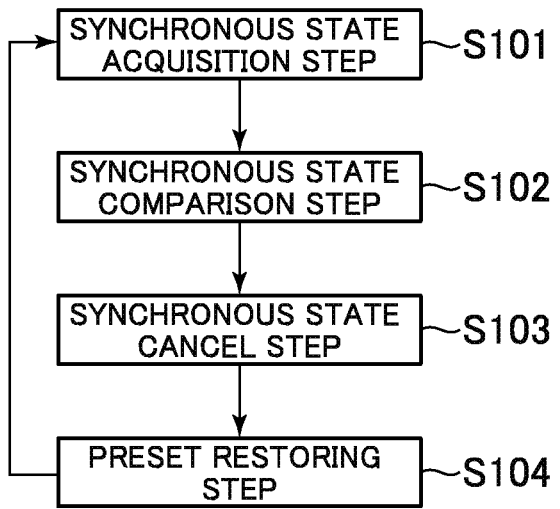
FIG. 6 is a flowchart illustrating a control method for the content reproduction system according to the first embodiment.
FIG. 7 is a schematic diagram illustrating a plurality of pieces of preset information stored in the operation apparatus according to the first embodiment.

Hereinafter, a description will be made of a control method for the content reproduction system 1000 according to the present embodiment. FIG. 6 is a flowchart illustrating the control method for the content reproduction system 1000 of the present embodiment.

Synchronous State Acquisition Step S101

First, the operation apparatus 100 performs synchronous state acquisition step S101 of acquiring the current synchronous state. The communication unit 40 of the operation apparatus 100 illustrated in FIG. 2 is connected to the network 300, and the control unit 50 acquires ON and OFF states of the power source or a synchronous state of each content reproduction apparatus via the communication unit 40. In the present embodiment, as illustrated in FIG. 4, the third content reproduction apparatus 200C is set as a master device, the second content reproduction apparatus 200B and the fourth content reproduction apparatus 200D are set as slave devices thereof, and the control unit 50 of the operation apparatus 100 recognizes that the power source of the first content reproduction apparatus 200A is in an OFF state.

Synchronous State Comparison Step S102

Next, the user performing an operation while viewing the display unit 10 of the operation apparatus 100 selects one of a plurality of presets stored in advance. A plurality of presets as illustrated in FIG. 7 are stored in the storage unit 60 of the operation apparatus 100. In the present embodiment, as a first preset, a preset is registered in which the first content reproduction apparatus 200A is set as a master device, the second content reproduction apparatus 200B and the third content reproduction apparatus 200C are set as slave devices thereof, and a network radio A is reproduced. As a second preset, a preset is registered in which the third content reproduction apparatus 200C is set as a master device, the fourth content reproduction apparatus 200D is set as a slave device, and a CD inserted into the third content reproduction apparatus 200C is reproduced. As a third preset, a preset is registered in which the first content reproduction apparatus 200A is set as a master device, the second content reproduction apparatus 200B is set as a slave device thereof, and the network radio A is reproduced. As a fourth preset, a preset is registered in which the second content reproduction apparatus 200B is set as a master device, the third content reproduction apparatus 200C and the fourth content reproduction apparatus 200D are set as slave devices thereof, and a TV is reproduced by using an external input. As illustrated in FIG. 7, a preset of the present disclosure is not limited to a preset for presetting reproduction of the content which is held by a content reproduction apparatus or can be acquired, and may include a preset for presetting reproduction of the content which is not held by the content reproduction apparatus or cannot be acquired, using an external input.

In the present embodiment, as illustrated in FIG. 7, a master device and a slave device are included in all of the presets, and thus a plurality of content reproduction apparatuses are included therein, but there may be a configuration which includes a preset in which only one content reproduction apparatus is included, and which presets content reproduction or switching of an external input in the single content reproduction apparatus.

It is assumed that the user selects the second preset on a preset selection screen displayed on the display unit 10 of the operation apparatus 100. In a case where the user touches text of the second preset displayed on the display unit 10 of the operation apparatus 100, the input unit 20 included in the touch panel 30 detects the touch, and a signal corresponding thereto is transmitted to the control unit 50. Thus, the operation apparatus 100 compares the current synchronous state with a synchronous state in the second preset, and thus recognizes that a master device is common to the third content reproduction apparatus 200C, and the fourth content reproduction apparatus 200D is included as a slave device, but the second content reproduction apparatus 200B is not included in the second preset.

Synchronous State Cancel Step S103

The control unit 50 of the operation apparatus 100 transmits a synchronous state cancel signal for canceling the current synchronous state including a content reproduction apparatus common to a content reproduction apparatus included in a synchronous state which is selected and is to be restored. In the present embodiment, the third content reproduction apparatus 200C and the fourth content reproduction apparatus 200D are included in common between the current synchronous state and the synchronous state in the second preset to be restored, and thus a synchronous state cancel signal for canceling the current synchronous state is transmitted. A synchronous state of all content reproduction apparatuses included in the current synchronous state may be canceled by using the synchronous state cancel signal, but a synchronous state of a content reproduction apparatus common to the current synchronous state and a synchronous state to be restored may be maintained, and a synchronous state of only a content reproduction apparatus included in the current synchronous state and not included in the synchronous state to be restored may be canceled.

In the present embodiment, in the second preset to be restored from now on, the second content reproduction apparatus 200B is not included in a slave device, and thus the operation apparatus 100 transmits a synchronous state cancel signal for canceling a synchronous state of the second content reproduction apparatus 200B to the third content reproduction apparatus 200C which is a master device. The third content reproduction apparatus 200C having received the synchronous state cancel signal does not transmit a streaming signal generated thereby to the second content reproduction apparatus 200B.

Figure 8:
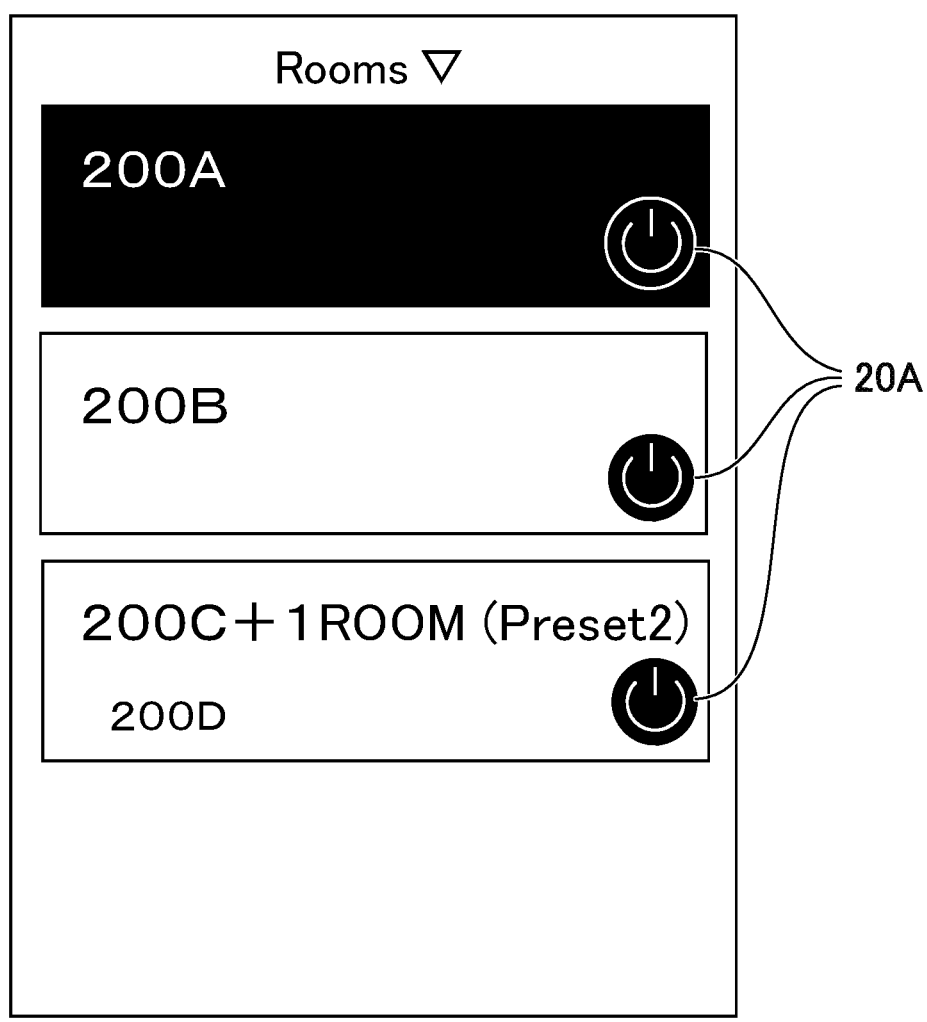
FIG. 8 is a schematic diagram of a user interface displayed by the operation apparatus and the display unit of the voice input apparatus according to the present disclosure.

The second content reproduction apparatus 200B is deviated from the synchronous state in which the third content reproduction apparatus 200C is a master device, and thus the display unit 10 of the operation apparatus 100 displays a user interface as illustrated in FIG. 8. In other words, the display unit 10 displays information indicating that a master device is the third content reproduction apparatus 200C, the fourth content reproduction apparatus 200D disposed in another room is a slave device, and a synchronous state in the second preset is currently restored.

The control unit 50 of the operation apparatus 100 transmits a command for stopping reproduction of the content reproduced by the third content reproduction apparatus 200C at this time, to the third content reproduction apparatus 200C.

In a case where the third content reproduction apparatus 200C reproduces a CD inserted into the third content reproduction apparatus 200C at this time as in the second preset registered in advance, the control unit 50 of the operation apparatus 100 may not transmit the command for stopping reproduction of the content to the third content reproduction apparatus 200C.

In the present embodiment, only a synchronous state of the second content reproduction apparatus 200B which is different from a synchronous state to be restored is canceled through comparison with the current synchronous state, but, synchronous states of the second content reproduction apparatus 200B, the third content reproduction apparatus 200C, and the fourth content reproduction apparatus 200D forming the current synchronous state may be temporarily canceled. Alternatively, the current synchronous states of all content reproduction apparatuses (the third content reproduction apparatus 200C and the fourth content reproduction apparatus 200D) included in a synchronous state to be restored may be temporarily canceled. In this case, in preset restoring step S104 which will be described later, synchronous states of the third content reproduction apparatus 200C and the fourth content reproduction apparatus 200D are required to be restored again, but there is an advantage that the current synchronous states can be canceled without checking and determining the current synchronous states.

Alternatively, the operation apparatus 100 may cancel synchronous states of all content reproduction apparatuses (in the present embodiment, the first content reproduction apparatus 200A, the second content reproduction apparatus 200B, the third content reproduction apparatus 200C, and the fourth content reproduction apparatus 200D) which are connected to each other via a LAN or the like and can be controlled in a local network.

However, preferably, only a synchronous state of a content reproduction apparatus not included in a synchronous state to be restored is canceled through comparison with the current synchronous state. This is because the content reproduction apparatus not included in the synchronous state to be restored can reproduce other content in another synchronous state.

In the present embodiment, the operation apparatus 100 transmits the synchronous state cancel signal for canceling a synchronous state of the second content reproduction apparatus 200B to only the third content reproduction apparatus 200C which is a master device included in a synchronous state to be restored, but the synchronous state cancel signal may be transmitted to all content reproduction apparatuses included in the synchronous state to be restored, that is, the third content reproduction apparatus 200C and the fourth content reproduction apparatus 200D. Alternatively, the operation apparatus 100 may transmit the synchronous state cancel signal for canceling a synchronous state of the second content reproduction apparatus 200B to all content reproduction apparatuses (in the present embodiment, the second content reproduction apparatus 200B, the third content reproduction apparatus 200C, and the fourth content reproduction apparatus 200D) synchronized with each other at this time. Alternatively, there may be a configuration in which the operation apparatus 100 transmits the synchronous state cancel signal to the second content reproduction apparatus 200B of which a synchronous state is canceled, and the second content reproduction apparatus 200B does not receive a streaming signal from the third content reproduction apparatus 200C which is a master device, or does not reproduce the streaming signal even if the streaming signal is received.

In a case where the current synchronous state is exactly the same as a synchronous state to be restored, the operation apparatus 100 may not transmit the synchronous state cancel signal.

Preset Restoring Step S104

The control unit 50 of the operation apparatus 100 restores the second preset selected by the user. In the present embodiment, in the synchronous state cancel step S103, the synchronous state of the second content reproduction apparatus 200B is canceled already, a master device is the third content reproduction apparatus 200C, and a slave device is only the fourth content reproduction apparatus 200D. In other words, the same synchronous state as in the second preset selected by the user occurs already, and thus the operation apparatus 100 does not perform a special process for restoring a synchronous state.

Since the synchronous state is restored, the control unit 50 transmits a command signal for giving an instruction for reproducing the content included in the CD inserted into the third content reproduction apparatus 200C in order to restore the second preset. The command signal for giving an instruction for reproducing the content included in the CD may be a command signal for giving an instruction for sequentially reproducing the CD from the first song, and may be a command signal for giving an instruction for reproducing a song with a specific track number included in the CD.

The wireless LAN communication unit 156 of the third content reproduction apparatus 200C receives the command signal. The control unit 150 of the third content reproduction apparatus 200C instructs the signal output portion 153 to reproduce the content included in the CD. The signal output portion 153 of the third content reproduction apparatus 200C reproduces the content included in the CD via the buffer 154. Simultaneously, the control unit 150 of the third content reproduction apparatus 200C causes the signal output portion 153 to generate a streaming signal of the content included in the CD. The third content reproduction apparatus 200C delivers the streaming signal to the fourth content reproduction apparatus 200D via the network 300. In the fourth content reproduction apparatus 200D, the control unit 150 receives the streaming signal via the wireless LAN communication unit 156. The control unit 150 instructs the signal output portion 153 to output the streaming signal of the content. The fourth content reproduction apparatus 200D reproduces the streaming signal of the content in the CD without using the buffer 154, and thus the third content reproduction apparatus 200C and the fourth content reproduction apparatus 200D perform synchronous reproduction.

Synchronous State Acquisition Step S101

Next, it is assumed that the user performing an operation while viewing the display unit 10 of the operation apparatus 100 selects the third preset from among the plurality of presets illustrated in FIG. 7. In a case where the user touches text of the third preset displayed on the display unit 10 of the operation apparatus 100, the input unit 20 included in the touch panel 30 detects the touch, and a signal corresponding thereto is transmitted to the control unit 50. Consequently, the flow returns to the synchronous state acquisition step S101.

In the present embodiment, the control unit 50 of the operation apparatus 100 recognizes that the current state is the second preset, a master device is the third content reproduction apparatus 200C, and a slave device is the fourth content reproduction apparatus 200D.

Synchronous State Comparison Step S102

Next, the operation apparatus 100 compares the current second preset with the third preset to be restored from now on, and thus recognizes that master devices are different from each other since a master device is the third content reproduction apparatus 200C in the current second preset, and is the first content reproduction apparatus 200A in the third preset to be restored from now on, and, with respect to slave devices, the fourth content reproduction apparatus 200D is included in the current second preset, and the second content reproduction apparatus 200B is included instead of the fourth content reproduction apparatus 200D in the third preset to be restored from now on.

Synchronous State Cancel Step S103

The control unit 50 of the operation apparatus 100 transmits a synchronous state cancel signal for canceling the current synchronous state including a content reproduction apparatus common to a content reproduction apparatus included in a synchronous state which is selected and is to be restored.

In the present embodiment, a common content reproduction apparatus is not included between the current synchronous state in the second preset and the synchronous state in the third preset to be restored, and thus the control unit 50 of the operation apparatus 100 does not transmit a synchronous state cancel signal for canceling the current synchronous state.

Therefore, the third content reproduction apparatus 200C continuously transmits a streaming signal to the fourth content reproduction apparatus 200D which is the current slave device.

Figure 9:
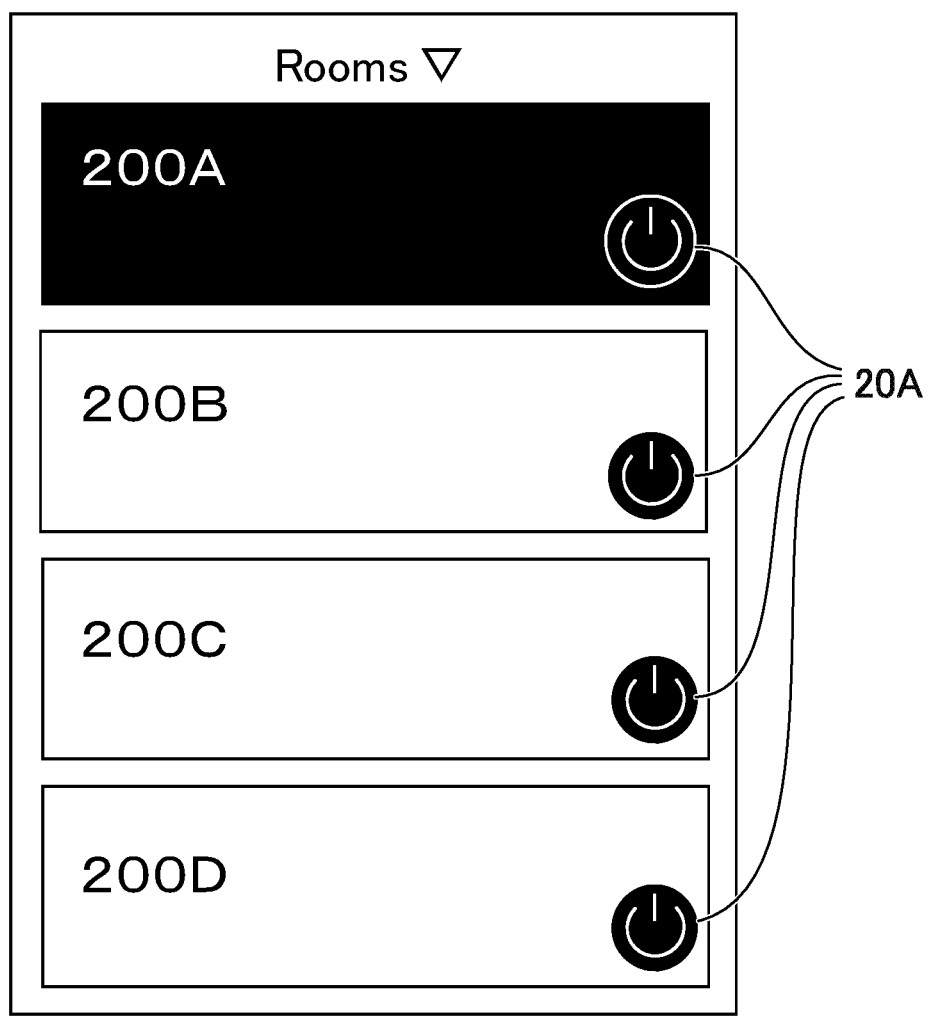
FIG. 9 is a schematic diagram of a user interface displayed by the operation apparatus and the display unit of the voice input apparatus according to the present disclosure.

In the present embodiment, a description has been made of a configuration in which the current synchronous state not including a content reproduction apparatus common to a synchronous state to be restored is not canceled and is continuously maintained, but all of the current synchronous states may be canceled. In this case, the operation apparatus 100 transmits a synchronous state cancel signal for canceling synchronous states of the third content reproduction apparatus 200C and the fourth content reproduction apparatus 200D currently synchronized with each other. Alternatively, the operation apparatus 100 may transmit a synchronous state cancel signal for temporarily canceling synchronous states of all content reproduction apparatuses which can be controlled via the network. In this case, the synchronous state in which the third content reproduction apparatus 200C is a master device is canceled, and thus the display unit 10 of the operation apparatus 100 displays a user interface as illustrated in FIG. 9. In other words, the display unit 10 displays information regarding each content reproduction apparatus separately. Alternatively, a synchronous state cancel signal for canceling synchronous states of all content reproduction apparatuses (the first content reproduction apparatus 200A and the second content reproduction apparatus 200B) included in a synchronous state to be restored may be transmitted without checking the current synchronous state. This is because, if a synchronous state of a content reproduction apparatus included in a new synchronous state to be restored is canceled, the synchronous state to be restored can be restored without hindrance in preset restoring step S104.

Preset Restoring Step S104

The control unit 50 of the operation apparatus 100 transmits a preset restoring signal for restoring the third preset selected by the user. In the present embodiment, the control unit 50 of the operation apparatus 100 transmits a master device setting signal for instructing the first content reproduction apparatus 200A to reproduce the content as a master device, to the first content reproduction apparatus 200A. Here, as illustrated in FIG. 4, since the power source of the first content reproduction apparatus 200A is in an OFF state, and, thus, first, the control unit 50 of the operation apparatus 100 transmits a command signal for turning on the power source to the first content reproduction apparatus 200A, and then transmits the master device setting signal. The control unit 50 of the operation apparatus 100 transmits a slave device setting signal for instructing the second content reproduction apparatus 200B to reproduce a streaming signal generated by the first content reproduction apparatus 200A as a slave device of the first content reproduction apparatus 200A, to the second content reproduction apparatus 200B. As mentioned above, the master device setting signal and the slave device setting signal can be said to be one type of preset restoring signal.

Figure 10:
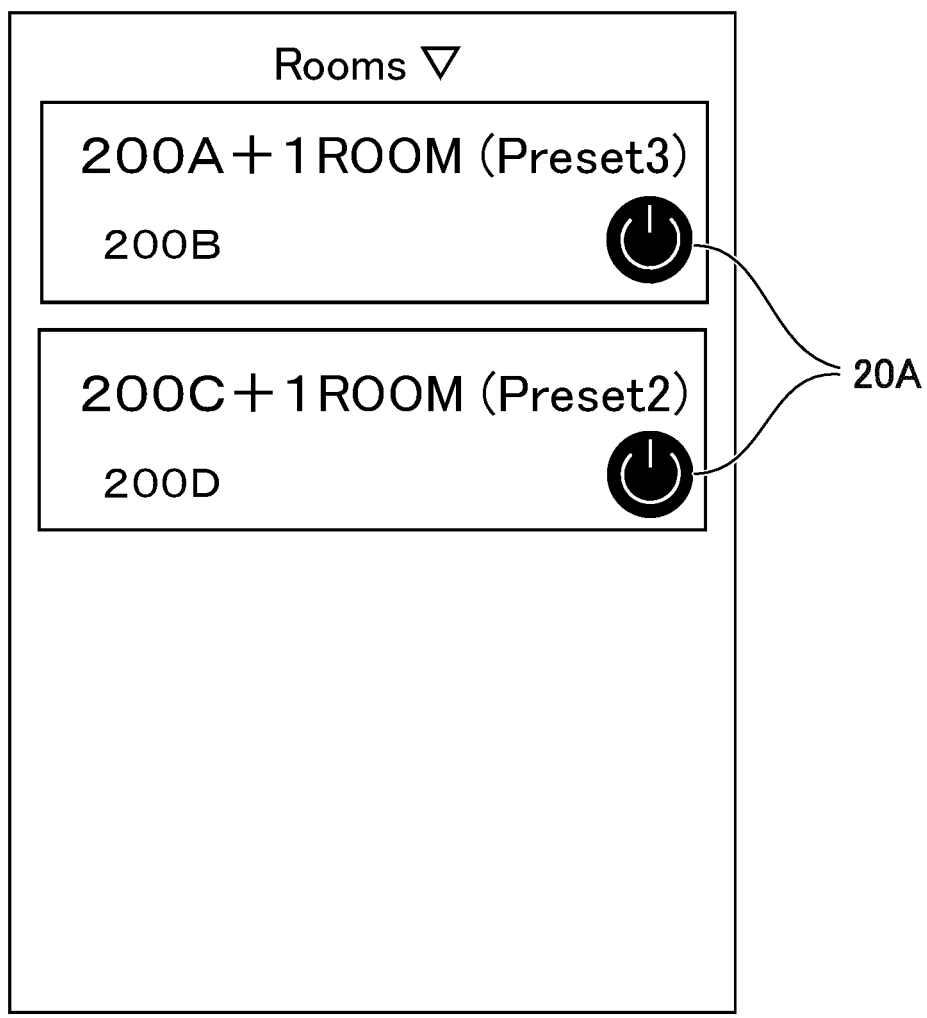
FIG. 10 is a schematic diagram of a user interface displayed by the operation apparatus and the display unit of the voice input apparatus according to the present disclosure.

A synchronous state in which the first content reproduction apparatus 200A is a master device is set, and thus the display unit 10 of the operation apparatus 100 displays a user interface as illustrated in FIG. 10. In other words, the display unit 10 displays information indicating that a master device is the first content reproduction apparatus 200A, the second content reproduction apparatus 200B disposed in another room is a slave device, and the third preset is currently restored. In the synchronous state cancel step S103, in a case where the second preset is not canceled, the display unit 10 displays information indicating that the second preset is maintained.

Some extent of time elapse is required between transmission of a command signal for turning on the power source and transmission of the master device setting signal or the slave device setting signal as the preset restoring signal in the operation apparatus 100. In other words, some time is required after a content reproduction apparatus is brought into a power source ON state by receiving the command signal until the content reproduction apparatus is brought into a state of being able to receive the master device setting signal or the slave device setting signal. Thus, preferably, the operation apparatus 100 transmits the master device setting signal or the slave device setting signal in accordance with a content reproduction apparatus which requires the longest time after the apparatus is brought into a power source ON state until it is then brought into a state of being able to receive the master device setting signal or the slave device setting signal among content reproduction apparatuses included in a preset. A delay time of each content reproduction apparatus may be stored in the storage unit 60 of the operation apparatus 100, may be included in the program 62 of the storage unit 60, and may be included in the plurality of pieces of preset information illustrated in FIG. 7.

Next, the control unit 50 transmits a command signal to the first content reproduction apparatus 200A via the network 300 in order to restore the third preset. The command signal includes details related to instructions for acquiring the content of the network radio A, reproducing the content by using the signal output portion 153, generating a streaming signal of the content, and delivering the streaming signal to the second content reproduction apparatus 200B.

Here, in a case where the control unit 50 of the operation apparatus 100 transmits a command signal regarding reproduction of the content, the command signal is preferably transmitted after a synchronous state is reliably built. Thus, preferably, the control unit 50 of the operation apparatus 100 confirms that the operation apparatus 100 transmits the master device setting signal or the slave device setting signal, and then each content reproduction apparatus is brought into a predetermined synchronous state, and transmits a command signal regarding content reproduction. Alternatively, there may be a configuration in which the control unit 50 of the operation apparatus 100 supposes time related to setting of a synchronous state in advance, and transmits a command signal regarding content reproduction with the elapse of the time from transmission of a master device setting signal or a slave device setting signal as a trigger.

The wireless LAN communication unit 156 of the first content reproduction apparatus 200A receives the command signal regarding the content reproduction. The control unit 150 of the first content reproduction apparatus 200A acquires a content source from the network radio A via the wireless LAN communication unit 156, and instructs the signal output portion 153 to reproduce the content. The signal output portion 153 of the first content reproduction apparatus 200A reproduces the content of the network radio A via the buffer 154. Simultaneously, the signal output portion 153 of the first content reproduction apparatus 200A generates a streaming signal of the content of the network radio A. The first content reproduction apparatus 200A delivers the streaming signal to the second content reproduction apparatus 200B via the network 300. In the second content reproduction apparatus 200B, the control unit 150 receives the streaming signal via the wireless LAN communication unit 156. The control unit 150 of the second content reproduction apparatus 200B instructs the signal output portion 153 to output the streaming signal of the content. The signal output portion 153 of the second content reproduction apparatus 200B reproduces the streaming signal of the content of the network radio A without using the buffer 154, and thus the first content reproduction apparatus 200A and the second content reproduction apparatus 200B perform synchronous reproduction.

In the present embodiment, the operation apparatus 100 transmits a command signal for turning on the power source to only the first content reproduction apparatus 200A of which the power source in an OFF state among content reproduction apparatuses included in a preset to be restored from now on, but may transmit a command signal for turning on power sources of all content reproduction apparatuses included in the preset to be restored from now on to the content reproduction apparatuses. As long as a command signal for turning on power sources of all content reproduction apparatuses included in a preset is transmitted, the operation apparatus 100 can transmit a command signal for turning on a power source without checking ON and OFF states of the power source of the content reproduction apparatus.

Synchronous State Acquisition Step S101

Next, it is assumed that the user performing an operation while viewing the display unit 10 of the operation apparatus 100 selects the first preset from among the plurality of presets illustrated in FIG. 7. In a case where the user touches text of the first preset displayed on the display unit 10 of the operation apparatus 100, the input unit 20 included in the touch panel 30 detects the touch, and a signal corresponding thereto is transmitted to the control unit 50. Consequently, the flow returns to the synchronous state acquisition step S101.

In the present embodiment, the control unit 50 of the operation apparatus 100 recognizes that the current state is the third preset, a master device is the first content reproduction apparatus 200A, and a slave device is the second content reproduction apparatus 200B.

Synchronous State Comparison Step S102

Next, the operation apparatus 100 compares the current third preset with the first preset to be restored from now on, and thus recognizes that master devices are the same as each other since a master device is the first content reproduction apparatus 200A in the current third preset, and, with respect to slave devices, the second content reproduction apparatus 200B is included in the current third preset, and the third content reproduction apparatus 200C is included in addition to the second content reproduction apparatus 200B in the first preset to be restored from now on.

In the present embodiment, the operation apparatus 100 compares the second preset with the first preset to be restored from now on, and thus recognizes that a master device in the second preset is different from a master device in the first preset, but the third content reproduction apparatus 200C is included in both of the two presets.

Synchronous State Cancel Step S103

The control unit 50 of the operation apparatus 100 transmits a synchronous state cancel signal for canceling the current synchronous state including a content reproduction apparatus common to a content reproduction apparatus included in a synchronous state which is selected and is to be restored. In the present embodiment, the first content reproduction apparatus 200A and the second content reproduction apparatus 200B are included in common between the synchronous state in the third preset of the current synchronous states and the synchronous state in the first preset to be restored. The third content reproduction apparatus 200C is included in common between the synchronous state in the second preset of the current synchronous states and the synchronous state in the first preset to be restored. Thus, the operation apparatus 100 transmits a synchronous state cancel signal for canceling the current synchronous states. Synchronous states of all content reproduction apparatuses included in the current synchronous state may be canceled by using the synchronous state cancel signal, but a synchronous state of a common content reproduction apparatus may be maintained, and a synchronous state of only a content reproduction apparatus included in the current synchronous state and not included in a synchronous state to be restored may be canceled.

In the present embodiment, in the first preset to be restored, the third content reproduction apparatus 200C is required to be added to a slave device. Therefore, the operation apparatus 100 transmits a synchronous state cancel signal for instructing the third content reproduction apparatus 200C to be deviated from another synchronous group currently including the third content reproduction apparatus 200C to the third content reproduction apparatus 200C which is a master device in the second preset of the current synchronous state. The third content reproduction apparatus 200C which is a master device being deviated from the synchronous group indicates that the entire synchronous group is canceled, and thus the operation apparatus 100 transmits a synchronous state cancel signal for canceling a synchronous state of the fourth content reproduction apparatus 200D included in the synchronous group in addition to the third content reproduction apparatus 200C. The synchronous state of the third content reproduction apparatus 200C functioning as a slave device in the first preset is canceled earlier, and thus smooth transition to the first preset state to be restored from now on can be performed.

In the present embodiment, the content to be reproduced is the same network radio A, and thus the first content reproduction apparatus 200A may continuously reproduce the content of the network radio A without stopping reproduction of the content.

Preset Restoring Step S104

The control unit 50 of the operation apparatus 100 restores the first preset state selected by the user. In the present embodiment, the control unit 50 of the operation apparatus 100 transmits a slave device setting signal for instructing the third content reproduction apparatus 200C to reproduce a streaming signal generated by the first content reproduction apparatus 200A as a slave device of the first content reproduction apparatus 200A, to the third content reproduction apparatus 200C.

Figure 11:
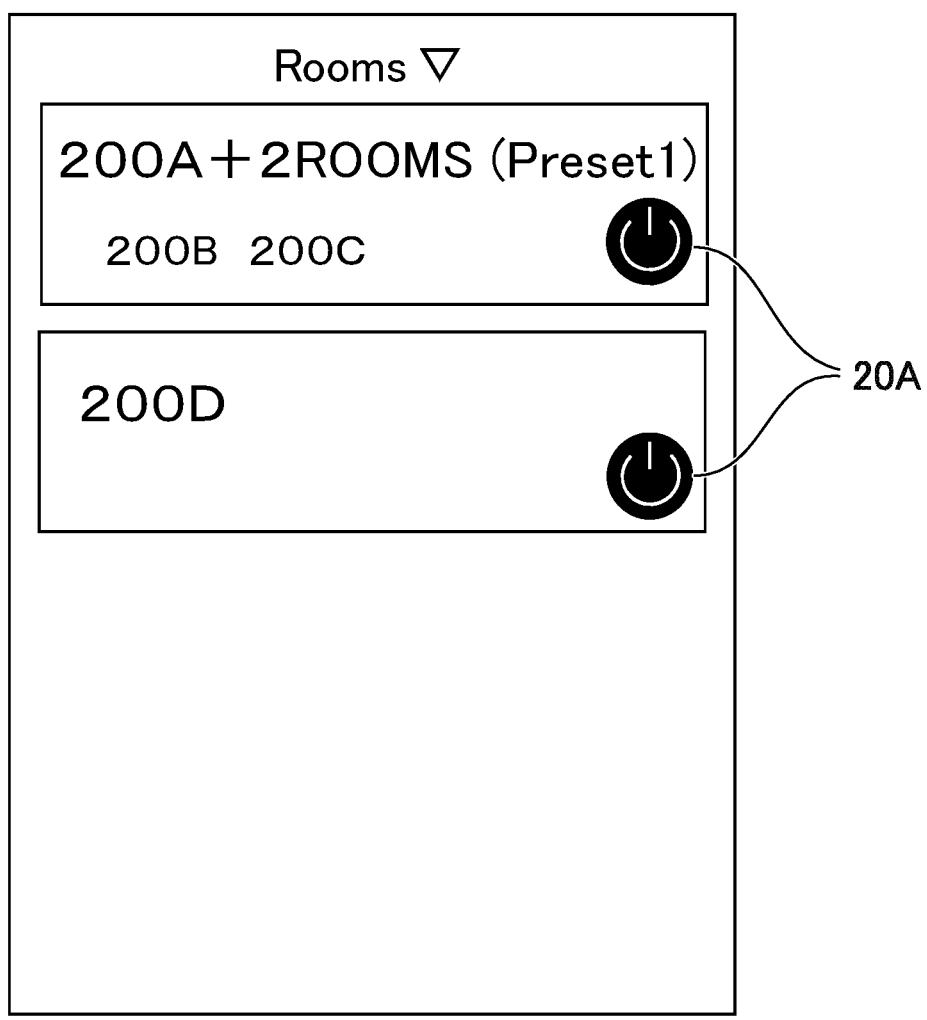
FIG. 11 is a schematic diagram of a user interface displayed by the operation apparatus and the display unit of the voice input apparatus according to the present disclosure.

The third content reproduction apparatus 200C is added as a slave device, and thus the display unit 10 of the operation apparatus 100 displays a user interface as illustrated in FIG. 11. In other words, the display unit 10 displays information indicating that a master device is the first content reproduction apparatus 200A, the second content reproduction apparatus 200B and the third content reproduction apparatus 200C disposed in two other rooms are slave devices, and the first preset is currently restored.

In order to restore the first preset, the control unit 50 of the operation apparatus 100 transmits a command signal for instructing the first content reproduction apparatus 200A to generate a streaming signal of the content of the network radio A and to transmit the streaming signal not only to the second content reproduction apparatus 200B but also to the third content reproduction apparatus 200C.

The wireless LAN communication unit 156 of the first content reproduction apparatus 200A receives the command signal. The control unit 150 of the first content reproduction apparatus 200A continuously acquires a content source from the network radio A via the wireless LAN communication unit 156, and instructs the signal output portion 153 to reproduce the content. The signal output portion 153 of the first content reproduction apparatus 200A reproduces the content of the network radio A via the buffer 154. Simultaneously, the signal output portion 153 of the first content reproduction apparatus 200A generates a streaming signal of the content of the network radio A. The first content reproduction apparatus 200A delivers the streaming signal to the second content reproduction apparatus 200B and the third content reproduction apparatus 200C via the network 300. In each of the second content reproduction apparatus 200B and the third content reproduction apparatus 200C, the control unit 150 receives the streaming signal via the wireless LAN communication unit 156. The control unit 150 instructs the signal output portion 153 to output the streaming signal of the content. The signal output portion 153 of each of the second content reproduction apparatus 200B and the third content reproduction apparatus 200C reproduces the streaming signal of the content of the network radio A without using the buffer 154, and thus the first content reproduction apparatus 200A, the second content reproduction apparatus 200B, and the third content reproduction apparatus 200C perform synchronous reproduction.

Synchronous State Acquisition Step S101

Next, it is assumed that the user performing an operation while viewing the display unit 10 of the operation apparatus 100 selects the fourth preset from among the plurality of presets illustrated in FIG. 7. In a case where the user touches text of the fourth preset displayed on the display unit 10 of the operation apparatus 100, the input unit 20 included in the touch panel 30 detects the touch, and a signal corresponding thereto is transmitted to the control unit 50. Consequently, the flow returns to the synchronous state acquisition step S101.

In the present embodiment, the control unit 50 of the operation apparatus 100 recognizes that the current state is the first preset, a master device is the first content reproduction apparatus 200A, and slave devices are the second content reproduction apparatus 200B and the third content reproduction apparatus 200C.

Synchronous State Comparison Step S102

Next, the operation apparatus 100 compares the current first preset with the fourth preset to be restored from now on, and thus recognizes that a master device is the first content reproduction apparatus 200A in the current first preset, but a master device is the second content reproduction apparatus 200B in the fourth preset to be restored from now on. The operation apparatus 100 recognizes that, with respect to slave devices, the second content reproduction apparatus 200B and the third content reproduction apparatus 200C are included as slave devices in the current first preset, but, in the fourth preset to be restored from now on, the third content reproduction apparatus 200C is continuously included as a slave device, and the second content reproduction apparatus 200B is not included as a slave device, and, instead, the fourth content reproduction apparatus 200D is included as a slave device.

Synchronous State Cancel Step S103

The control unit 50 of the operation apparatus 100 transmits a synchronous state cancel signal for canceling the current synchronous state including a content reproduction apparatus common to a content reproduction apparatus included in a synchronous state which is selected and is to be restored. In the present embodiment, the second content reproduction apparatus 200B and the third content reproduction apparatus 200C are included in common between the current synchronous state in the first preset and the synchronous state in the fourth preset to be restored, and a synchronous state cancel signal for canceling the current synchronous state is transmitted. Synchronous states of all content reproduction apparatuses included in the current synchronous state may be canceled by using the synchronous state cancel signal, but a synchronous state of a common content reproduction apparatus may be maintained, and a synchronous state of only a content reproduction apparatus included in the current synchronous state and not included in a synchronous state to be restored may be canceled.

In the present embodiment, in the fourth preset, a master device is changed from the first content reproduction apparatus 200A to the second content reproduction apparatus 200B, and thus a synchronous state cancel signal for canceling the current synchronous state is transmitted to the first content reproduction apparatus 200A which is a master device in the current state. The first content reproduction apparatus 200A having received the synchronous state cancel signal stops to transmit a streaming signal generated thereby to the second content reproduction apparatus 200B and the third content reproduction apparatus 200C which are slave devices in the current state.

Figure 12:
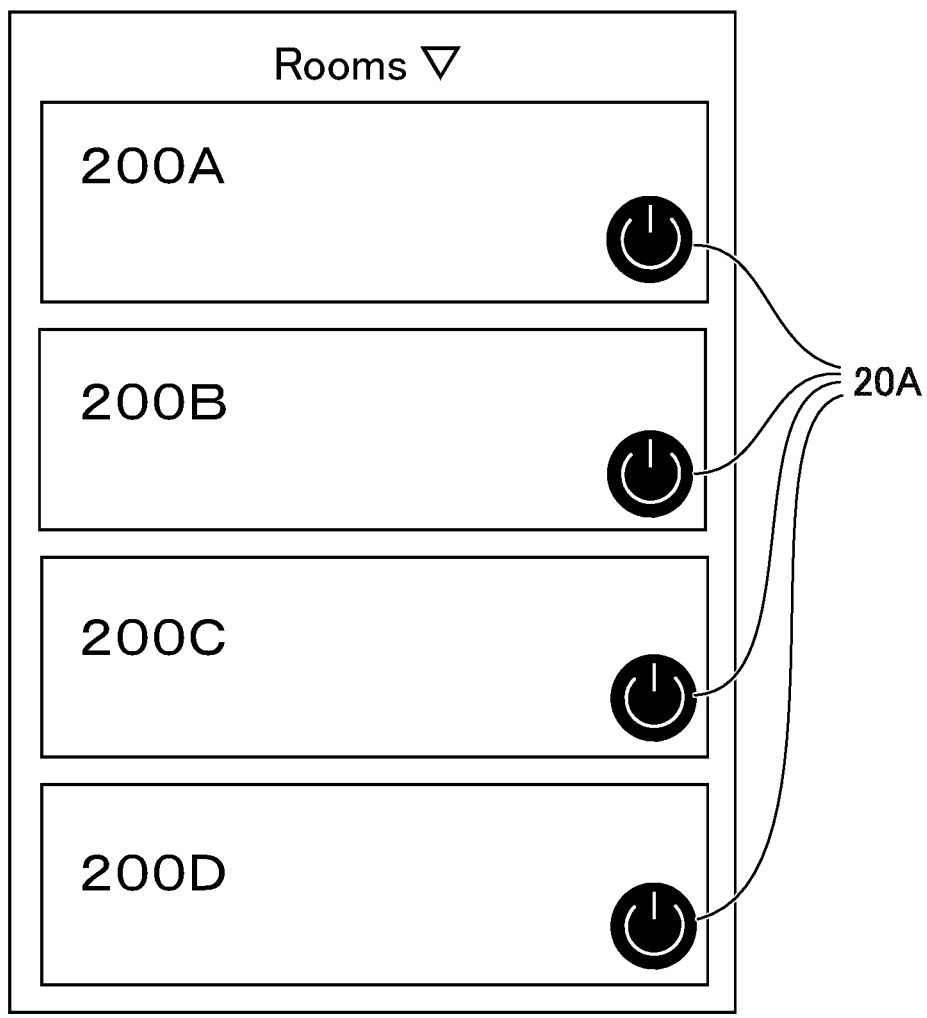
FIG. 12 is a schematic diagram of a user interface displayed by the operation apparatus and the display unit of the voice input apparatus according to the present disclosure.

The synchronous state in which the first content reproduction apparatus 200A is a master device is canceled, and thus the display unit 10 of the operation apparatus 100 displays a user interface as illustrated in FIG. 12. In other words, the display unit 10 displays information regarding each content reproduction apparatus separately.

In the present embodiment, in the fourth preset to be restored from now on, the content to be reproduced is TV distribution using an external input, and reproduction thereof is different from the current reproduction of the content of the network radio A, and thus the operation apparatus 100 transmits a command for stopping reproduction of the content of the network radio A in the current first content reproduction apparatus 200A to the first content reproduction apparatus 200A.

The first content reproduction apparatus 200A is not included in the fourth preset to be restored from now on, and thus the first content reproduction apparatus 200A may continuously reproduce the content of the network radio A. In other words, the operation apparatus 100 may not transmit a command for stopping content reproduction to the first content reproduction apparatus 200A.

Preset Restoring Step S104

The control unit 50 of the operation apparatus 100 restores the fourth preset selected by the user. In the present embodiment, the control unit 50 of the operation apparatus 100 transmits a master device setting signal to the second content reproduction apparatus 200B, and transmits a slave device setting signal to the third content reproduction apparatus 200C and the fourth content reproduction apparatus 200D.

Figure 13:
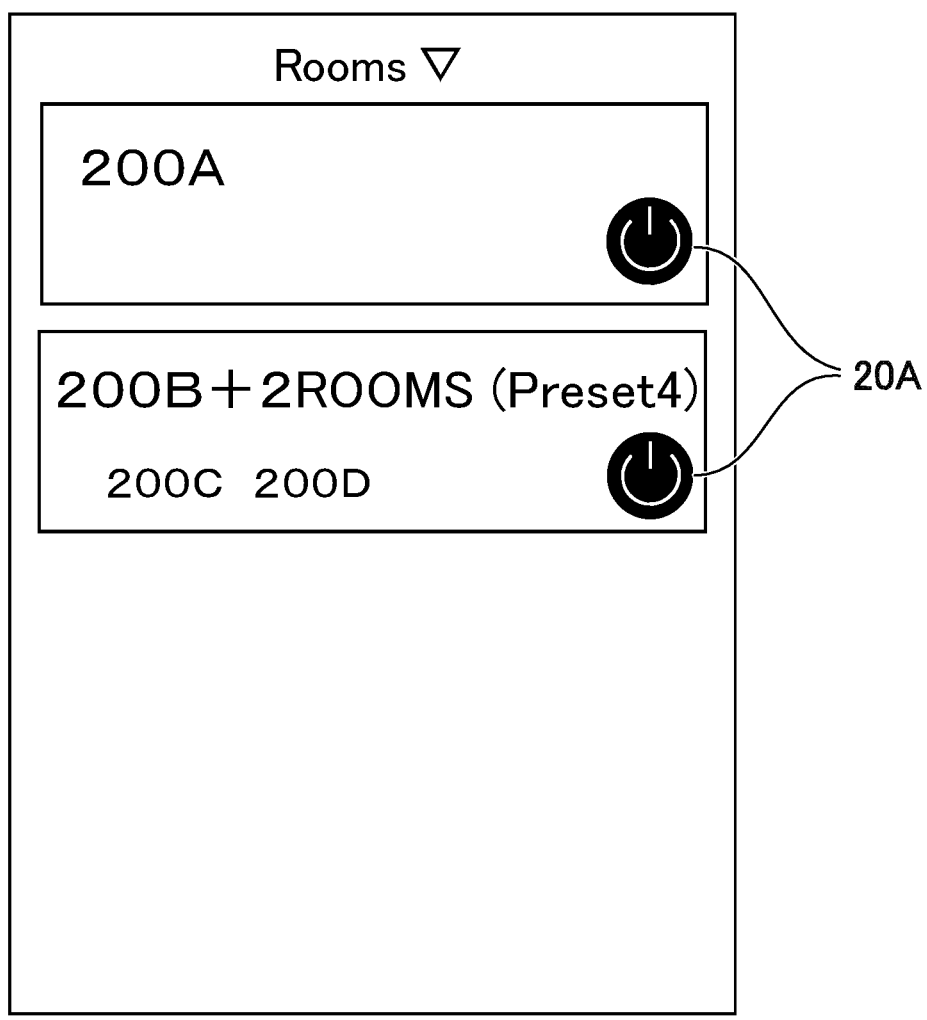
FIG. 13 is a schematic diagram of a user interface displayed by the operation apparatus and the display unit of the voice input apparatus according to the present disclosure.

A synchronous state in the fourth preset in which the second content reproduction apparatus 200B is set as a master device is restored, and thus the display unit 10 of the operation apparatus 100 displays a user interface as illustrated in FIG. 13. In other words, the display unit 10 displays information indicating that a master device is the second content reproduction apparatus 200B, the third content reproduction apparatus 200C and the fourth content reproduction apparatus 200D disposed in two other rooms are slave devices, and the fourth preset is currently restored.

In order to restore the fourth preset, the control unit 50 transmits a command signal for instructing the second content reproduction apparatus 200B to acquire TV content via an external input terminal, generate a streaming signal, and transmit the streaming signal to the third content reproduction apparatus 200C and the fourth content reproduction apparatus 200D.

The wireless LAN communication unit 156 of the second content reproduction apparatus 200B receives the command signal. The control unit 150 of the second content reproduction apparatus 200B acquires the TV content via the external input terminal, and instructs the signal output portion 153 to reproduce the content. The signal output portion 153 of the second content reproduction apparatus 200B reproduces the TV content via the buffer 154. Simultaneously, the signal output portion 153 of the second content reproduction apparatus 200B generates a streaming signal of the TV content. The second content reproduction apparatus 200B delivers the streaming signal to the third content reproduction apparatus 200C and the fourth content reproduction apparatus 200D via the network 300. In each of the third content reproduction apparatus 200C and the fourth content reproduction apparatus 200D, the control unit 150 receives the streaming signal via the wireless LAN communication unit 156. The control unit 150 instructs the signal output portion 153 to output the streaming signal of the content. The signal output portion 153 of each of the third content reproduction apparatus 200C and the fourth content reproduction apparatus 200D reproduces the streaming signal of the TV content without using the buffer 154, and thus the second content reproduction apparatus 200B, the third content reproduction apparatus 200C, and the fourth content reproduction apparatus 200D perform synchronous reproduction.

Regarding a reproduction volume in each content reproduction apparatus, the storage unit 60 of the operation apparatus 100 may store a predetermined volume value for each preset, and thus a reproduction volume value in all content reproduction apparatuses included in a single preset may be constant, and the storage unit 60 may store a separate volume value in each content reproduction apparatus in each preset.

As a preset name displayed on the display unit 10 of the operation apparatus 100, for example, a simple name with a number of the preset, such as "Room Preset1", may be used, and, as in the example of "200C+2Rooms" illustrated in FIG. 4, this is preferable since a content reproduction apparatus name serving as a master device is displayed, and information regarding the number of content reproduction apparatuses serving as slave devices is also displayed, so that the user can be assisted in specifically understanding a synchronous state in a preset.

Alternatively, as a preset name displayed on the display unit 10 of the operation apparatus 100, for example, a plurality of place names, such as "Living Room+Kitchen+Den+Dining", in which a plurality of content reproduction apparatuses synchronized with each other are disposed are displayed, and thus this is preferable since the user can be assisted in specifically understanding a synchronous state in a preset.

As a preset name displayed on the display unit 10 of the operation apparatus 100, as in an example of "Living Room Link Preset", this is preferable since a place name in which a content reproduction apparatus serving as a master device is disposed is displayed, and information indicating that the current synchronous state is a synchronous state restored by a preset is also displayed, so that the user can be assisted in specifically understanding a synchronous state in the preset.

As a preset name displayed on the display unit 10 of the operation apparatus 100, as in an example of "Living Room Link With Artist A", this is preferable since an artist name of the content to be reproduced or a music name is displayed, and thus the user can be assisted in specifically understanding content reproduction details in a preset.

As a preset name displayed on the display unit 10 of the operation apparatus 100, as in an example of "Living Room Link With TV", this is preferable since, if the content to be reproduced is based on an external input such as a TV broadcast, such information is displayed, the user can be assisted in specifically understanding content reproduction details in a preset.

As a preset name displayed on the display unit 10 of the operation apparatus 100, as in an example of "Party" or "Morning", this is preferable since the name includes a situation or a time period in which the content is reproduced, and thus the user can be assisted in specifically understanding content reproduction details in a preset.

Second Embodiment

A second embodiment of the present disclosure will be hereinafter described with reference to the drawings. The same configuration as in the first embodiment is given the same reference numeral, and a description thereof will be omitted in some cases.

Content Reproduction System 2000

Figure 14:
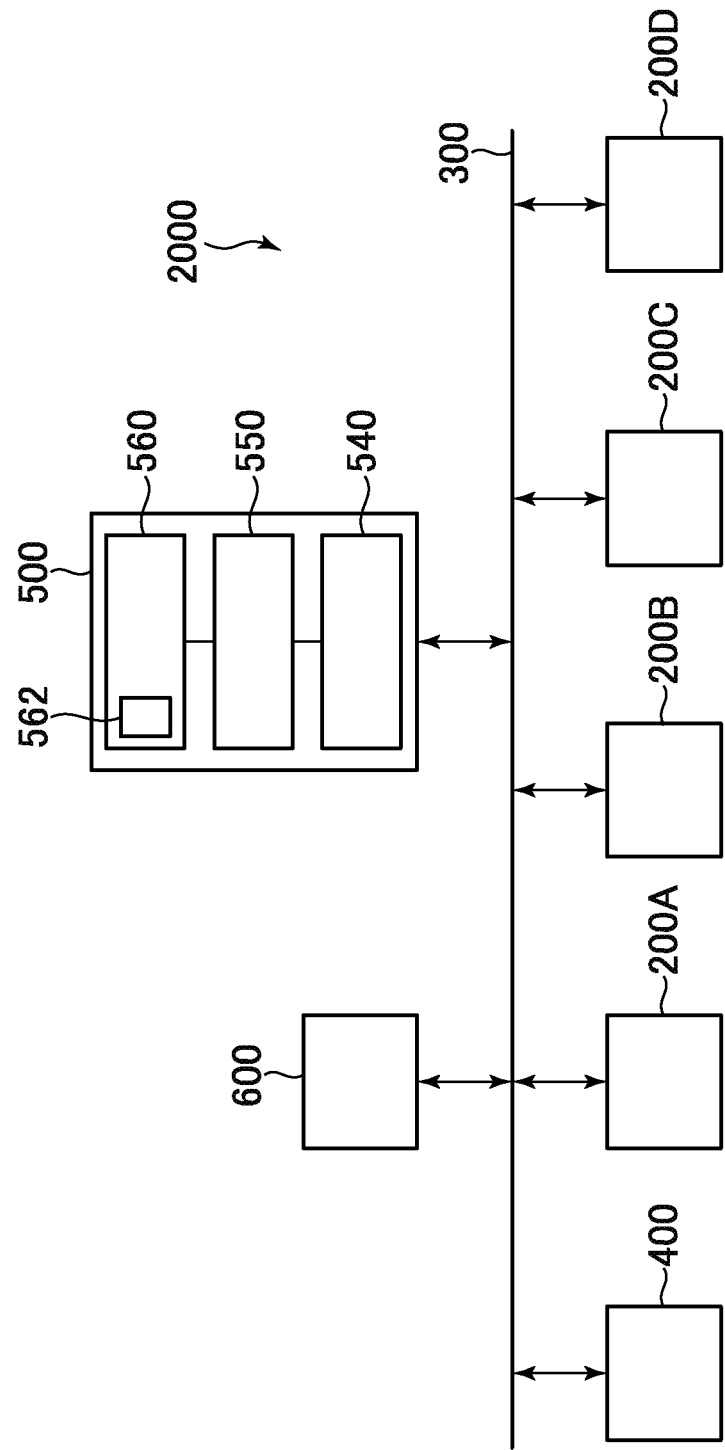
FIG. 14 is a schematic diagram of a content reproduction system according to a second embodiment.

FIG. 14 is a schematic diagram illustrating a content reproduction system 2000 according to the present embodiment.

The content reproduction system 2000 includes a voice input apparatus 400, a first content reproduction apparatus 200A, a second content reproduction apparatus 200B, a third content reproduction apparatus 200C, a fourth content reproduction apparatus 200D, a command processing apparatus 500, and a voice recognition apparatus 600.

The voice input apparatus 400 is a device such as a smart phone which is connectable to the network 300 and collects voices of a user, and is provided in a local area including the first content reproduction apparatus 200A, the second content reproduction apparatus 200B, the third content reproduction apparatus 200C, and the fourth content reproduction apparatus 200D. The local area is an area with a restricted range in which communication can be performed via a LAN or the like.

The voice input apparatus 400, the first content reproduction apparatus 200A, the second content reproduction apparatus 200B, the third content reproduction apparatus 200C, and the fourth content reproduction apparatus 200D can access a wide area network via a router or the like. The wide area is an area also including a local area, and is an area in which communication can be performed via the Internet.

The voice recognition apparatus 600 and the command processing apparatus 500 are disposed on the wide area side. These are realized by, for example, a server computer.

In FIG. 14 illustrating the present embodiment, the voice recognition apparatus 600 and the command processing apparatus 500 are illustrated separately, but may be formed of the same server computer. In other words, the command processing apparatus 500 may have the voice recognition apparatus 600 built thereinto, and signal transmission may be performed between the command processing apparatus 500 and the voice recognition apparatus 600 without using a network. In other words, the command processing apparatus 500 including the voice recognition apparatus 600 may perform voice recognition.

In the present embodiment, the content reproduction system 2000 is configured to include four content reproduction apparatuses, but the number of content reproduction apparatuses is not limited to four.

Network 300

The network 300 includes a wireless local area network (LAN) such as a Wireless-Fidelity (Wi-Fi; registered trademark), a wired LAN, a wide area network (WAN), and the like, and is used as a signal transmission path among the voice input apparatus 400, the first content reproduction apparatus 200A, the second content reproduction apparatus 200B, the third content reproduction apparatus 200C, the fourth content reproduction apparatus 200D, the command processing apparatus 500, and the voice recognition apparatus 600.

Voice Input Apparatus 400

The voice input apparatus 400 is a computer such as a smart phone, a tablet computer, a personal computer, or a dedicated controller, and an apparatus which is connectable to the network 300 and can collect voices of the user.

In the present embodiment, a description will be made of a case where the voice input apparatus 400 is a smart phone.

Figures 15, 16:
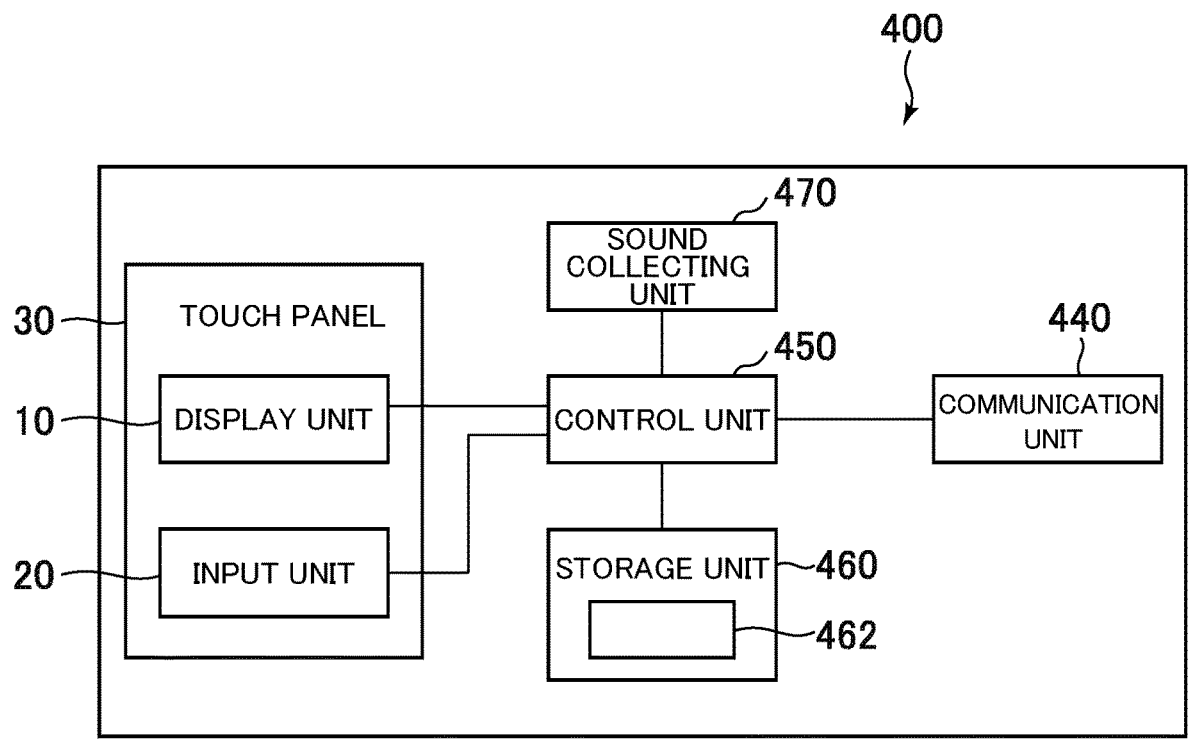
FIG. 15 is a block diagram illustrating a voice input apparatus according to the second embodiment.
FIG. 16 is a schematic diagram illustrating a preset table stored in a storage unit of a command processing apparatus according to the second embodiment.

FIG. 15 is a block diagram illustrating the voice input apparatus 400 according to the present embodiment. As illustrated in FIG. 15, the voice input apparatus 400 has constituent elements common to those of the operation apparatus 100 described in the first embodiment, and includes a display unit 10 on which a user interface is displayed, and an input unit 20 used for a user to perform an input operation according to the displayed user interface, a touch panel 30 including the display unit 10 and the input unit 20, a control unit 450 which controls the entire voice input apparatus 400, and a storage unit 460 which stores a program 462 used for the control unit 450 to perform various pieces of control. The voice input apparatus 400 includes a sound collecting unit 470 which collects voices of the user.

The voice input apparatus 400 is a computer which performs voice input step S201 which will be described later on the basis of the program. The program may be installed from various recording media such as an optical medium or a magnetic medium, and may be downloaded via the Internet.

Sound Collecting Unit 470

The sound collecting unit 470 includes a microphone, collects voices from the user with the microphone, and generates voice data on the basis of the voices. The voices from the user include an operation instruction, and the voice data generated by the sound collecting unit 470 includes the operation instruction.

Communication Unit 440

A communication unit 440 transmits command signals generated by the control unit 450 to the first content reproduction apparatus 200A, the second content reproduction apparatus 200B, the third content reproduction apparatus 200C, and the fourth content reproduction apparatus 200D via the network 300. The communication unit 440 acquires ON and OFF states of power sources of the first content reproduction apparatus 200A, the second content reproduction apparatus 200B, the third content reproduction apparatus 200C, and the fourth content reproduction apparatus 200D, and acquires information regarding current synchronous states of the first content reproduction apparatus 200A, the second content reproduction apparatus 200B, the third content reproduction apparatus 200C, and the fourth content reproduction apparatus 200D.

In the present embodiment, the communication unit 440 accesses the wide area network via the network 300, and performs transmission and reception of signals with the command processing apparatus 500 and the voice recognition apparatus 600.

Control Unit 450

The control unit 450 includes a processor and a memory, and controls operations of the touch panel 30 including the display unit 10 and the input unit 20, the communication unit 440, the storage unit 460, and the sound collecting unit 470 on the basis of the program 462 stored in the storage unit 460.

In a case where information regarding the ON and OFF states of the power sources and the current synchronous states of the first content reproduction apparatus 200A, the second content reproduction apparatus 200B, the third content reproduction apparatus 200C, and the fourth content reproduction apparatus 200D is acquired via the communication unit 440, the control unit 450 transmits the information regarding the states to the display unit 10 and instructs the display unit 10 to display the information thereon.

In a case where the sound collecting unit 470 generates voice data including an operation instruction by the user inputting voices, the control unit 450 transmits the voice data to the voice recognition apparatus 600 via the communication unit 440. In this case, the control unit 450 transmits the voice data along with a user ID allocated to the voice input apparatus 400.

For example, in a case where the user says "first preset" in order to select one of a plurality of presets registered in advance in the storage unit 460, the voices are collected by the sound collecting unit 470, and thus voice data is generated. The control unit 450 adds the user ID allocated to the voice input apparatus 400 to the voice data regarding "first preset" which are the voices of the user, and transmits the voice data to the voice recognition apparatus 600.

Storage Unit 460

The program 462 used by the control unit 450 is stored in the storage unit 460.

The storage unit 460 stores a plurality of presets, and the presets include, for example, information regarding synchronous states set in advance, information regarding content to be reproduced, and information regarding an external input in a case where the external input is used.

Voice Recognition Apparatus 600

The voice recognition apparatus 600 is implemented by, for example, a server computer.

The voice recognition apparatus 600 is a computer which performs voice recognition step S202 which will be described later on the basis of the program. The program may be installed from various recording media such as an optical medium or a magnetic medium, and may be downloaded via the Internet.

The voice recognition apparatus 600 performs a voice recognition process so as to convert voice data including an operation instruction transmitted from the voice input apparatus 400 into data with a format which can be processed in the command processing apparatus 500. For example, the voice recognition apparatus 600 converts the voice data into text data with a predetermined format.

The voice recognition apparatus 600 transmits the text data including the operation instruction to the command processing apparatus 500 along with a user ID allocated to the voice input apparatus 400.

For example, in a case where the voice recognition apparatus 600 receives the voice data regarding "first preset" which are voices of the user from the control unit 450 of the voice input apparatus 400 along with the user ID allocated to the voice input apparatus 400, the voice recognition apparatus 600 converts the voice data into text data, and transmits the text data to the command processing apparatus 500 along with the user ID allocated to the voice input apparatus 400.

Command Processing Apparatus 500

As illustrated in FIG. 14, the command processing apparatus 500 is implemented by, for example, a server computer, and includes a communication unit 540 which is connectable to the network 300, a control unit 550 which controls the entire command processing apparatus 500, and a storage unit 560 which stores a program 562 used for the control unit 550 to perform control.

The command processing apparatus 500 is a computer which performs synchronous state acquisition step S203, synchronous state comparison step S204, synchronous state cancel step S205, and preset restoring step S206 which will be described later on the basis of the program. The program may be installed from various recording media such as an optical medium or a magnetic medium, and may be downloaded via the Internet.

Communication Unit 540

The communication unit 540 receives text data including an operation instruction from the voice recognition apparatus 600 via the network 300. The communication unit 540 transmits command signals generated by the control unit 550 to the first content reproduction apparatus 200A, the second content reproduction apparatus 200B, the third content reproduction apparatus 200C, and the fourth content reproduction apparatus 200D via the network 300. The communication unit 540 acquires ON and OFF states of power sources of the first content reproduction apparatus 200A, the second content reproduction apparatus 200B, the third content reproduction apparatus 200C, and the fourth content reproduction apparatus 200D, and acquires information regarding current synchronous states of the first content reproduction apparatus 200A, the second content reproduction apparatus 200B, the third content reproduction apparatus 200C, and the fourth content reproduction apparatus 200D.

Storage Unit 560

The program 562 used by the control unit 550 is stored in the storage unit 560.

The storage unit 560 may register a plurality of presets for each user ID. FIG. 16 illustrates an example of a preset table stored in the storage unit 560. The preset table is stored in correlation with a user ID for each user. A user ID used in the command processing apparatus 500 may or may not be the same as a user ID used in the voice input apparatus 400 and the voice recognition apparatus 600. However, in a case where user IDs are different from each other, correspondence relationship data for converting the user IDs is required to be stored in the command processing apparatus 500 or the voice recognition apparatus 600.

The preset table includes, for example, information regarding synchronous states set in advance, information regarding content to be reproduced, and information regarding an external input in a case where the external input is used.

Figure 17:
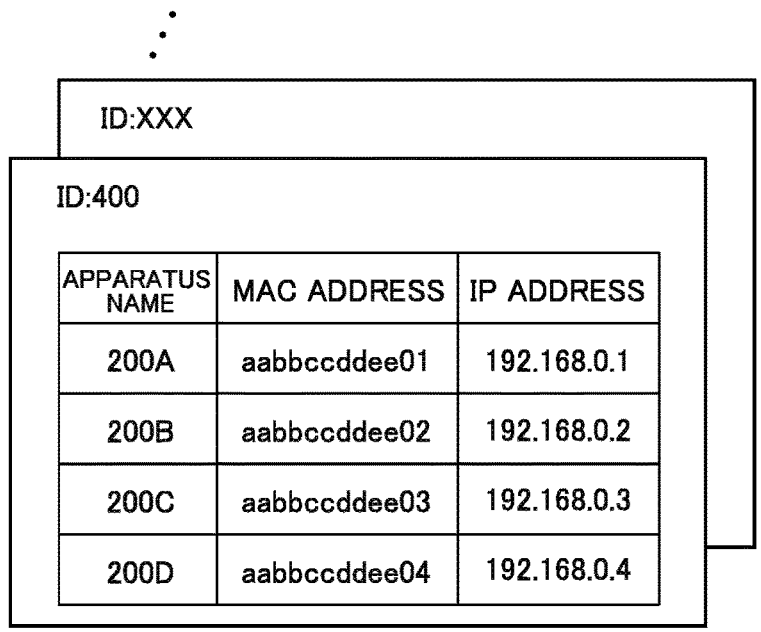
FIG. 17 is a schematic diagram illustrating a content reproduction apparatus table stored in the storage unit of the command processing apparatus according to the second embodiment.

The storage unit 560 stores information regarding a content reproduction apparatus owned by each user for each user ID. FIG. 17 illustrates an example of a content reproduction apparatus table stored in the storage unit 560. The apparatus table is stored in correlation with a user ID for each user. A user ID used in the command processing apparatus 500 may or may not be the same as a user ID used in the voice input apparatus 400 and the voice recognition apparatus 600. However, in a case where user IDs are different from each other, correspondence relationship data for converting the user IDs is required to be stored in the command processing apparatus 500 or the voice recognition apparatus 600.

The content reproduction apparatus table includes information such as an apparatus name of each content reproduction apparatus, a MAC address, and an IP address. The MAC address and the IP address indicate a MAC address and an IP address set for a wired or wireless network interface card provided in each content reproduction apparatus.

In the present embodiment, the command processing apparatus 500 includes the storage unit 560 storing the content reproduction apparatus table, but the command processing apparatus 500 may not store the content reproduction apparatus table, and may acquire information such as an apparatus name of each content reproduction apparatus, a MAC address, and an IP address from an external apparatus of the command processing apparatus 500 via the network 300.

Each user registers information regarding a content reproduction apparatus owned by the user and a state regarding a desired preset by using a communication function of the voice input apparatus 400 in the preset table and the content reproduction apparatus table. When each content reproduction apparatus is connected to the network 300 and is activated, information regarding the content reproduction apparatus may be transmitted to the command processing apparatus 500 along with a user ID so as to be registered in the content reproduction apparatus table.

Control Unit 550

The control unit 550 includes a processor and a memory, and controls operations of the communication unit 540 and the storage unit 560 on the basis of the program 562 stored in the storage unit 560.

In a case where the text data added with the user ID allocated to the voice input apparatus 400, including an operation instruction for restoring the "first preset" is received from the voice recognition apparatus 600 via the communication unit 540, first, the control unit 550 searches for a preset table corresponding to the user ID allocated to the voice input apparatus 400 from the storage unit 560. If the preset table matching the user ID is found out, information regarding the first preset is searched for from the preset table.

The control unit 550 refers to the preset table, and generates a synchronous state cancel signal and a preset restoring signal to be transmitted to a content reproduction apparatus included in the first preset. The synchronous state cancel signal and the preset restoring signal are described as in the first embodiment.

Next, the control unit 50 refers to the content reproduction apparatus table, checks a MAC address or an IP address of a content reproduction apparatus to which the synchronous state cancel signal and the preset restoring signal are to be transmitted, and transmits the synchronous state cancel signal or the preset restoring signal to the predetermined content reproduction apparatus on the basis of the MAC address or the IP address.

First Content Reproduction Apparatus 200A

Next, with reference to FIG. 5, the first content reproduction apparatus 200A will be described. The first content reproduction apparatus 200A fundamentally has a configuration common to the configuration described in the first embodiment.

In the present embodiment, the wireless LAN communication unit 156 performs wireless communication with the voice input apparatus 400, the command processing apparatus 500, and other content reproduction apparatuses (the second content reproduction apparatus 200B, the third content reproduction apparatus 200C, the fourth content reproduction apparatus 200D, and the like).

The wired LAN communication unit 157 has a cable connector, and performs wired communication with the voice input apparatus 400, the command processing apparatus 500, and the other content reproduction apparatuses (the second content reproduction apparatus 200B, the third content reproduction apparatus 200C, the fourth content reproduction apparatus 200D, and the like).

Configurations of the second content reproduction apparatus 200B, the third content reproduction apparatus 200C, and the fourth content reproduction apparatus 200D are assumed to be the same as the configuration of the first content reproduction apparatus 200A, and thus a description thereof will be omitted.

Control Method for Content Reproduction System 2000

Figure 18:
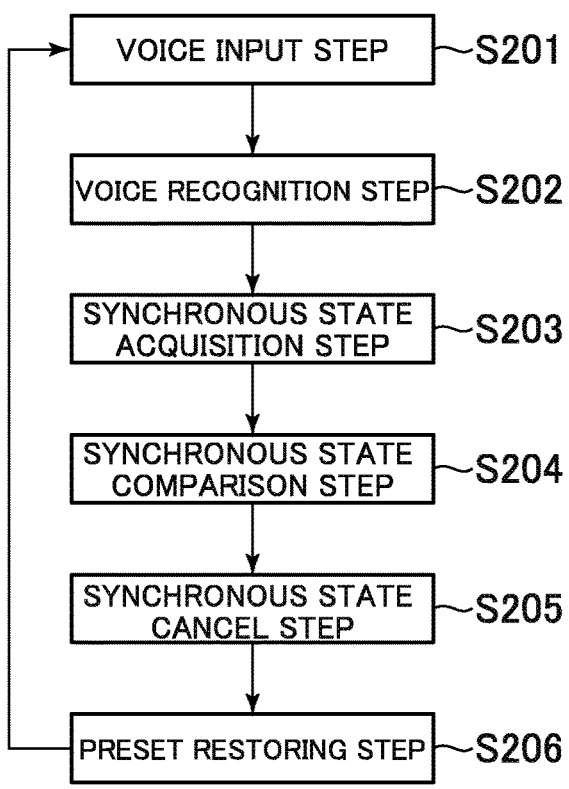
FIG. 18 is a flowchart illustrating a control method for the content reproduction system according to the second embodiment.

Hereinafter, a description will be made of a control method for the content reproduction system 2000 according to the present embodiment. FIG. 18 is a flowchart illustrating the control method for the content reproduction system 2000 of the present embodiment.

Voice Input Step S201

First, the user issues voices including an operation instruction toward the voice input apparatus 400. The voice input apparatus 400 receiving the voices collects the voices of the user with the sound collecting unit 470, so as to generate voice data.

The control unit 450 of the voice input apparatus 400 transmits the voice data to the voice recognition apparatus 600 via the network 300.

In the present embodiment, the user says "second preset", voices including an operation instruction for restoring the second preset are converted into voice data in the voice input apparatus 400, and the voice data is transmitted to the voice recognition apparatus 600.

In the present embodiment, the voice input apparatus 400 adds a user ID allocated to the voice input apparatus 400 to the voice data.

Voice Recognition Step S202

In a case where the voice data is received via the network 300, the voice recognition apparatus 600 performs a voice recognition process, and converts the voice data into a data with a format which can be processed in the command processing apparatus 500.

In the present embodiment, the voice recognition apparatus 600 converts the voice data including the operation instruction for restoring the second preset into text data with a predetermined format which can be processed in the command processing apparatus 500.

The voice recognition apparatus 600 transmits the text data including the operation instruction for restoring the second preset to the command processing apparatus 500 along with the user ID allocated to the voice input apparatus 400.

Synchronous State Acquisition Step S203

Next, the command processing apparatus 500 performs synchronous state acquisition step S203 of acquiring the current synchronous state. The communication unit 540 of the command processing apparatus 500 illustrated in FIG. 14 is connected to the network 300, and the control unit 550 acquires ON and OFF states of the power source or a synchronous state of each content reproduction apparatus via the communication unit 540. When a synchronous state is acquired, the content reproduction apparatus table (FIG. 17) corresponding to the received user ID allocated to the voice input apparatus 400 is referred to, and information regarding ON and OFF states of the power source or a synchronous state of each content reproduction apparatus is acquired via the network 300 by using the MAC address or the IP address written therein.

In the present embodiment, the control unit 550 of the command processing apparatus 500 recognizes that the third content reproduction apparatus 200C is set as a master device, the second content reproduction apparatus 200B and the fourth content reproduction apparatus 200D are set as slave devices thereof, and the power source of the first content reproduction apparatus 200A is in an OFF state via the network 300.

Synchronous State Comparison Step S204

The command processing apparatus 500 has already received the text data including the operation instruction for restoring the second preset from the voice recognition apparatus 600 along with the user ID allocated to the voice input apparatus 400. The command processing apparatus 500 compares the current synchronous state with a synchronous state in the second preset to be restored from now on. When comparison between the synchronous states is performed, the command processing apparatus 500 refers to the preset table (FIG. 16) corresponding to the received user ID allocated to the voice input apparatus 400, and acquires information such as a master device, a slave device, the content, and an external input in each preset.

In the present embodiment, the command processing apparatus 500 compares the current synchronous state with a synchronous state in the second preset, and thus recognizes that a master device is common to the third content reproduction apparatus 200C, and the fourth content reproduction apparatus 200D is included as a slave device, but the second content reproduction apparatus 200B is not included in the second preset.

Synchronous State Cancel Step S205

The control unit 550 of the command processing apparatus 500 transmits a synchronous state cancel signal for canceling the current synchronous state including a content reproduction apparatus common to a content reproduction apparatus included in a synchronous state which is selected and is to be restored. In the present embodiment, the third content reproduction apparatus 200C and the fourth content reproduction apparatus 200D are included in common between the current synchronous state and the synchronous state in the second preset to be restored, and thus a synchronous state cancel signal for canceling the current synchronous state is transmitted. A synchronous state of all content reproduction apparatuses included in the current synchronous state may be canceled by using the synchronous state cancel signal, but a synchronous state of a content reproduction apparatus common to the current synchronous state may be maintained, and a synchronous state of only a content reproduction apparatus included in the current synchronous state, but not included in the synchronous state to be restored may be canceled.

In the present embodiment, in the second preset to be restored from now on, the second content reproduction apparatus 200B is not included in a slave device, and thus the control unit 550 of the command processing apparatus 500 transmits a synchronous state cancel signal for canceling a synchronous state of the second content reproduction apparatus 200B to the third content reproduction apparatus 200C which is a master device. The third content reproduction apparatus 200C having received the synchronous state cancel signal does not transmit a streaming signal generated thereby to the second content reproduction apparatus 200B.

The voice input apparatus 400 may acquire information indicating that the second content reproduction apparatus 200B is deviated from the synchronous state in which the third content reproduction apparatus 200C is a master device via the network 300, and the display unit 10 of the voice input apparatus 400 may display the user interface as illustrated in FIG. 8. In other words, the display unit 10 displays information indicating that a master device is the third content reproduction apparatus 200C, the fourth content reproduction apparatus 200D disposed in another room is a slave device, and the second preset is currently restored.

The control unit 550 of the command processing apparatus 500 transmits a command for stopping reproduction of the content reproduced by the third content reproduction apparatus 200C at this time, to the third content reproduction apparatus 200C.

In a case where the third content reproduction apparatus 200C reproduces a CD inserted into the third content reproduction apparatus 200C at this time as in the second preset registered in advance, the control unit 550 of the command processing apparatus 500 may not transmit the command for stopping reproduction of the content to the third content reproduction apparatus 200C.

In the present embodiment, only a synchronous state of the second content reproduction apparatus 200B which is different from a synchronous state to be restored is canceled through comparison with the current synchronous state, but, synchronous states of the second content reproduction apparatus 200B, the third content reproduction apparatus 200C, and the fourth content reproduction apparatus 200D forming the current synchronous state may be temporarily canceled. Alternatively, the current synchronous states of all content reproduction apparatuses (the third content reproduction apparatus 200C and the fourth content reproduction apparatus 200D) included in a synchronous state to be restored may be temporarily canceled. In this case, in preset restoring step S206 which will be described later, synchronous states of the third content reproduction apparatus 200C and the fourth content reproduction apparatus 200D are required to be restored again, but there is an advantage that the current synchronous states can be canceled without checking and determining the current synchronous states.

Alternatively, the content reproduction apparatus table (FIG. 17) corresponding to the received user ID allocated to the voice input apparatus 400 may be referred to, and synchronous states of all content reproduction apparatuses (in the present embodiment, the first content reproduction apparatus 200A, the second content reproduction apparatus 200B, the third content reproduction apparatus 200C, and the fourth content reproduction apparatus 200D) which are written therein may be canceled.

However, preferably, only a synchronous state of a content reproduction apparatus which is different from in a synchronous state to be restored is canceled through comparison with the current synchronous state. This is because the content reproduction apparatus not included in the synchronous state to be restored can reproduce other content in another synchronous state.

In the present embodiment, the command processing apparatus 500 transmits the synchronous state cancel signal for canceling a synchronous state of the second content reproduction apparatus 200B to only the third content reproduction apparatus 200C which is a master device included in a synchronous state to be restored, but the signal may be transmitted to all content reproduction apparatuses included in the synchronous state to be restored, that is, the third content reproduction apparatus 200C and the fourth content reproduction apparatus 200D. Alternatively, the command processing apparatus 500 may transmit the synchronous state cancel signal for canceling a synchronous state of the second content reproduction apparatus 200B to all content reproduction apparatuses (in the present embodiment, the second content reproduction apparatus 200B, the third content reproduction apparatus 200C, and the fourth content reproduction apparatus 200D) synchronized with each other at this time. Alternatively, there may be a configuration in which the command processing apparatus 500 transmits the synchronous state cancel signal to the second content reproduction apparatus 200B of which a synchronous state is canceled, and the second content reproduction apparatus 200B does not receive a streaming signal from the third content reproduction apparatus 200C which is a master device, or does not reproduce the streaming signal even if the streaming signal is received.

In a case where the current synchronous state is exactly the same as a synchronous state to be restored, the command processing apparatus 500 may not transmit the synchronous state cancel signal.

Preset Restoring Step S206

The control unit 550 of the command processing apparatus 500 restores the second preset selected by the user. In the present embodiment, in the synchronous state cancel step S205, the synchronous state of the second content reproduction apparatus 200B is canceled already, a master device is the third content reproduction apparatus 200C, and a slave device is only the fourth content reproduction apparatus 200D. In other words, the same synchronous state as in the second preset selected by the user occurs already, and thus the command processing apparatus 500 does not perform a special process for restoring a synchronous state.

Since the synchronous state is restored, the control unit 550 transmits a command signal for giving an instruction for reproducing the content included in the CD inserted into the third content reproduction apparatus 200C in order to restore the second preset.

The wireless LAN communication unit 156 of the third content reproduction apparatus 200C receives the command signal. The control unit 150 of the third content reproduction apparatus 200C instructs the signal output portion 153 to reproduce the content included in the CD. The signal output portion 153 of the third content reproduction apparatus 200C reproduces the content included in the CD via the buffer 154. Simultaneously, the control unit 150 of the third content reproduction apparatus 200C causes the signal output portion 153 to generate a streaming signal of the content included in the CD. The third content reproduction apparatus 200C delivers the streaming signal to the fourth content reproduction apparatus 200D via the network 300. In the fourth content reproduction apparatus 200D, the control unit 150 receives the streaming signal via the wireless LAN communication unit 156. The control unit 150 instructs the signal output portion 153 to output the streaming signal of the content. The fourth content reproduction apparatus 200D reproduces the streaming signal of the content in the CD without using the buffer 154, and thus the third content reproduction apparatus 200C and the fourth content reproduction apparatus 200D perform synchronous reproduction.

Voice Input Step S201

Next, the user says "third preset", voices including an operation instruction for restoring the third preset are converted into voice data in the voice input apparatus 400, and the voice data is transmitted to the voice recognition apparatus 600. Consequently, the flow returns to voice input step S201.

In the present embodiment, the voice input apparatus 400 adds a user ID allocated to the voice input apparatus 400 to the voice data.

Voice Recognition Step S202

In a case where the voice data is received via the network 300, the voice recognition apparatus 600 performs a voice recognition process, and converts the voice data into data with a format which can be processed in the command processing apparatus 500.

In the present embodiment, the voice recognition apparatus 600 converts the voice data including the operation instruction for restoring the third preset into text data with a predetermined format which can be processed in the command processing apparatus 500.

The voice recognition apparatus 600 transmits the text data including the operation instruction for restoring the third preset to the command processing apparatus 500 along with the user ID allocated to the voice input apparatus 400.

Synchronous State Acquisition Step S203

The command processing apparatus 500 performs synchronous state acquisition step S203 of acquiring the current synchronous state.

In the present embodiment, the control unit 550 of the command processing apparatus 500 recognizes that the current state is the second preset, a master device is the third content reproduction apparatus 200C, and a slave device is the fourth content reproduction apparatus 200D, via the network 300.

Synchronous State Comparison Step S204

The command processing apparatus 500 has already received the text data including the operation instruction for restoring the third preset from the voice recognition apparatus 600 along with the user ID allocated to the voice input apparatus 400. The command processing apparatus 500 compares the current second preset with the third preset to be restored from now on. When comparison between the synchronous states is performed, the command processing apparatus 500 refers to the preset table (FIG. 16) corresponding to the received user ID allocated to the voice input apparatus 400, and acquires information such as a master device, a slave device, the content, and an external input in each preset.

In the present embodiment, the command processing apparatus 500 compares the synchronous state in the current second preset with a synchronous state in the third preset to be restored from now on, and thus recognizes that master devices are different from each other since a master device is the third content reproduction apparatus 200C in the current second preset, and is the first content reproduction apparatus 200A in the third preset to be restored from now on, and, with respect to slave devices, the fourth content reproduction apparatus 200D is included in the current second preset, and the second content reproduction apparatus 200B is included instead of the fourth content reproduction apparatus 200D in the third preset to be restored from now on.

Synchronous State Cancel Step S205

The control unit 550 of the command processing apparatus 500 transmits a synchronous state cancel signal for canceling the current synchronous state including a content reproduction apparatus common to a content reproduction apparatus included in a synchronous state which is selected and is to be restored.

In the present embodiment, a common content reproduction apparatus is not included between the synchronous state in the current second preset and the synchronous state in the third preset to be restored, and thus the control unit 550 of the command processing apparatus 500 does not transmit a synchronous state cancel signal for canceling the current synchronous state.

Therefore, the third content reproduction apparatus 200C continuously transmits a streaming signal to the fourth content reproduction apparatus 200D which is the current slave device.

In the present embodiment, a description has been made of a configuration in which the current synchronous state not including a content reproduction apparatus common to a synchronous state to be restored is not canceled and is continuously maintained, but all of the current synchronous states may be canceled. In this case, the command processing apparatus 500 transmits a synchronous state cancel signal for canceling synchronous states of the third content reproduction apparatus 200C and the fourth content reproduction apparatus 200D currently synchronized with each other. Alternatively, the command processing apparatus 500 may transmit a synchronous state cancel signal for temporarily canceling synchronous states of all content reproduction apparatuses which can be controlled via the network. In this case, the voice input apparatus 400 may acquire information indicating that the synchronous state in which the third content reproduction apparatus 200C is a master device is canceled via the network 300, and the display unit 10 of the voice input apparatus 400 may display the user interface as illustrated in FIG. 9. In other words, the display unit 10 displays information regarding each content reproduction apparatus separately. Alternatively, a synchronous state cancel signal for canceling synchronous states of all content reproduction apparatuses (the first content reproduction apparatus 200A and the second content reproduction apparatus 200B) included in a synchronous state to be restored may be transmitted without checking the current synchronous state. This is because, if a synchronous state of a content reproduction apparatus included in a new synchronous state to be restored is canceled, the synchronous state to be restored can be restored without hindrance in preset restoring step S206.

Preset Restoring Step S206

The control unit 550 of the command processing apparatus 500 transmits a preset restoring signal for restoring the state in the third preset selected by the user. In the present embodiment, the control unit 550 of the command processing apparatus 500 transmits a master device setting signal for instructing the first content reproduction apparatus 200A to reproduce the content as a master device, to the first content reproduction apparatus 200A. Here, as illustrated in FIG. 8, since the power source of the first content reproduction apparatus 200A is in an OFF state, and, thus, first, the control unit 550 of the command processing apparatus 500 transmits a command signal for turning on the power source to the first content reproduction apparatus 200A, and then transmits the master device setting signal. The control unit 550 of the command processing apparatus 500 transmits a slave device setting signal for instructing the second content reproduction apparatus 200B to reproduce a streaming signal generated by the first content reproduction apparatus 200A as a slave device of the first content reproduction apparatus 200A, to the second content reproduction apparatus 200B. As mentioned above, the master device setting signal and the slave device setting signal can be said to be one type of preset restoring signal.

The voice input apparatus 400 may acquire information indicating that a synchronous state in which the first content reproduction apparatus 200A is a master device is set via the network 300, and the display unit 10 of the voice input apparatus 400 may display the user interface as illustrated in FIG. 10. In other words, the display unit 10 displays information indicating that a master device is the first content reproduction apparatus 200A, the second content reproduction apparatus 200B disposed in another room is a slave device, and the third preset is currently restored. In the synchronous state cancel step S205, in a case where the second preset is not canceled, the display unit 10 displays information indicating that the second preset is maintained.

Some extent of time elapse is required between transmission of a command signal for turning on the power source and transmission of the master device setting signal or the slave device setting signal as the preset restoring signal in the command processing apparatus 500. In other words, sometime is required after a content reproduction apparatus is brought into a power source ON state by receiving the command signal until the content reproduction apparatus is brought into a state of being able to receive the master device setting signal or the slave device setting signal. Thus, preferably, the command processing apparatus 500 transmits the master device setting signal or the slave device setting signal in accordance with a content reproduction apparatus which requires the longest time after the apparatus is brought into a power source ON state until it is then brought into a state of being able to receive the master device setting signal or the slave device setting signal among content reproduction apparatuses included in a preset.

Next, the control unit 550 transmits a command signal to the first content reproduction apparatus 200A via the network 300 in order to restore the third preset. The command signal includes details of instruction for acquiring the content of the network radio A, reproducing the content by using the signal output portion 153, generating a streaming signal of the content, and delivering the streaming signal to the second content reproduction apparatus 200B.

Here, in a case where the control unit 550 of the command processing apparatus 500 transmits a command signal regarding reproduction of the content, the command signal is preferably transmitted after a synchronous state is reliably built. Thus, preferably, the control unit 550 of the command processing apparatus 500 confirms that the command processing apparatus 500 transmits the master device setting signal or the slave device setting signal, and then each content reproduction apparatus is brought into a predetermined synchronous state, and transmits a command signal regarding content reproduction. Alternatively, there may be a configuration in which the control unit 550 of the command processing apparatus 500 assumes time related to setting of a synchronous state in advance, and transmits a command signal regarding content reproduction with the elapse of the time from transmission of a master device setting signal or a slave device setting signal as a trigger.

The wireless LAN communication unit 156 of the first content reproduction apparatus 200A receives the command signal regarding the content reproduction. The control unit 150 of the first content reproduction apparatus 200A acquires a content source from the network radio A via the wireless LAN communication unit 156, and instructs the signal output portion 153 to reproduce the content. The signal output portion 153 of the first content reproduction apparatus 200A reproduces the content of the network radio A via the buffer 154. Simultaneously, the signal output portion 153 of the first content reproduction apparatus 200A generates a streaming signal of the content of the network radio A. The first content reproduction apparatus 200A delivers the streaming signal to the second content reproduction apparatus 200B via the network 300. In the second content reproduction apparatus 200B, the control unit 150 receives the streaming signal via the wireless LAN communication unit 156. The control unit 150 of the second content reproduction apparatus 200B instructs the signal output portion 153 to output the streaming signal of the content. The signal output portion 153 of the second content reproduction apparatus 200B reproduces the streaming signal of the content of the network radio A without using the buffer 154, and thus the first content reproduction apparatus 200A and the second content reproduction apparatus 200B perform synchronous reproduction.

In the present embodiment, the command processing apparatus 500 transmits a command signal for turning on the power source to only the first content reproduction apparatus 200A of which the power source is in an OFF state among content reproduction apparatuses included in a preset to be restored from now on, but may transmit a command signal for turning on power sources of all content reproduction apparatuses included in the preset to be restored from now on to the content reproduction apparatuses. As long as a command signal for turning on power sources of all content reproduction apparatuses included in a preset is transmitted, the command processing apparatus 500 can transmit a command signal for turning on a power source without checking ON and OFF states of the power source of the content reproduction apparatus.

Voice Input Step S201

Next, the user says "first preset", voices including an operation instruction for restoring the first preset are converted into voice data in the voice input apparatus 400, and the voice data is transmitted to the voice recognition apparatus 600. Consequently, the flow returns to voice input step S201.

In the present embodiment, the voice input apparatus 400 adds a user ID allocated to the voice input apparatus 400 to the voice data.

Voice Recognition Step S202

In a case where the voice data is received via the network 300, the voice recognition apparatus 600 performs a voice recognition process, and converts the voice data into data with a format which can be processed in the command processing apparatus 500.

In the present embodiment, the voice recognition apparatus 600 converts the voice data including the operation instruction for restoring the first preset into text data with a predetermined format which can be processed in the command processing apparatus 500.

The voice recognition apparatus 600 transmits the text data including the operation instruction for restoring the first preset to the command processing apparatus 500 along with the user ID allocated to the voice input apparatus 400.

Synchronous State Acquisition Step S203

The command processing apparatus 500 performs synchronous state acquisition step S203 of acquiring the current synchronous state.

In the present embodiment, the control unit 550 of the command processing apparatus 500 recognizes that the current state is the third preset, a master device is the first content reproduction apparatus 200A, and a slave device is the second content reproduction apparatus 200B, via the network 300.

Synchronous State Comparison Step S204

The command processing apparatus 500 has already received the text data including the operation instruction for restoring the first preset from the voice recognition apparatus 600 along with the user ID allocated to the voice input apparatus 400. The command processing apparatus 500 compares the current third preset with the first preset to be restored from now on. When comparison between the synchronous states is performed, the command processing apparatus 500 refers to the preset table (FIG. 16) corresponding to the received user ID allocated to the voice input apparatus 400, and acquires information such as a master device, a slave device, the content, and an external input in each preset.

In the present embodiment, the command processing apparatus 500 compares the synchronous state in the current third preset with a synchronous state in the first preset to be restored from now on, and thus recognizes that master devices are the same as each other since a master device is the first content reproduction apparatus 200A in the current third preset, and, with respect to slave devices, the second content reproduction apparatus 200B is included in the current third preset, and the third content reproduction apparatus 200C is included in addition to the second content reproduction apparatus 200B in the first preset to be restored from now on.

In the present embodiment, the command processing apparatus 500 compares the second preset with the first preset to be restored from now on, and thus recognizes that the master device in the second preset is different from the master device in the first preset, but the third content reproduction apparatus 200C is included in both of the two presets.

Synchronous State Cancel Step S205

The control unit 550 of the command processing apparatus 500 transmits a synchronous state cancel signal for canceling the current synchronous state including a content reproduction apparatus common to a content reproduction apparatus included in a synchronous state which is selected and is to be restored. In the present embodiment, the first content reproduction apparatus 200A and the second content reproduction apparatus 200B are included in common between the synchronous state in the third preset of the current synchronous states and the synchronous state in the first preset to be restored. The third content reproduction apparatus 200C is included in common between the synchronous state in the second preset of the current synchronous states and the synchronous state in the first preset to be restored. Thus, the operation apparatus 100 transmits a synchronous state cancel signal for canceling the current synchronous states. Synchronous states of all content reproduction apparatuses included in the current synchronous state may be canceled by using the synchronous state cancel signal, but a synchronous state of a common content reproduction apparatus may be maintained, and a synchronous state of only a content reproduction apparatus included in the current synchronous state and not included in a synchronous state to be restored may be canceled.

In the present embodiment, in the first preset to be restored, the third content reproduction apparatus 200C is required to be added to a slave device. Therefore, the command processing apparatus 500 transmits a synchronous state cancel signal for instructing the third content reproduction apparatus 200C to be deviated from another synchronous group in which the third content reproduction apparatus 200C currently belongs to the third content reproduction apparatus 200C which is a master device in the second preset of the current synchronous state. The third content reproduction apparatus 200C which is a master device being deviated from the synchronous group indicates that the entire synchronous group is canceled, and thus the command processing apparatus 500 transmits a synchronous state cancel signal for canceling a synchronous state of the fourth content reproduction apparatus 200D included in the synchronous group in addition to the third content reproduction apparatus 200C. The synchronous state of the third content reproduction apparatus 200C functioning as a slave device in the first preset is canceled earlier, and thus smooth transition to the first preset state to be restored from now on can be performed.

In the present embodiment, the content to be reproduced is the same network radio A, and thus the first content reproduction apparatus 200A may continuously reproduce the content of the network radio A without stopping reproduction of the content.

Preset Restoring Step S206

The control unit 550 of the command processing apparatus 500 restores the first preset selected by the user. In the present embodiment, the control unit 550 of the command processing apparatus 500 transmits a slave device setting signal for instructing the third content reproduction apparatus 200C to reproduce a streaming signal generated by the first content reproduction apparatus 200A as a slave device of the first content reproduction apparatus 200A, to the third content reproduction apparatus 200C.

The voice input apparatus 400 may acquire information indicating that the third content reproduction apparatus 200C is added as a slave device via the network 300, and the display unit 10 of the voice input apparatus 400 may display the user interface as illustrated in FIG. 11. In other words, the display unit 10 displays information indicating that a master device is the first content reproduction apparatus 200A, the second content reproduction apparatus 200B and the third content reproduction apparatus 200C disposed in two other rooms are slave devices, and the first preset is currently restored.

In order to restore the first preset, the control unit 550 of the command processing apparatus 500 transmits a command signal for instructing the first content reproduction apparatus 200A to generate a streaming signal of the content of the network radio A and to transmit the streaming signal not only to the second content reproduction apparatus 200B but also to the third content reproduction apparatus 200C.

The wireless LAN communication unit 156 of the first content reproduction apparatus 200A receives the command signal. The control unit 150 of the first content reproduction apparatus 200A continuously acquires a content source from the network radio A via the wireless LAN communication unit 156, and instructs the signal output portion 153 to reproduce the content. The signal output portion 153 of the first content reproduction apparatus 200A reproduces the content of the network radio A via the buffer 154. Simultaneously, the signal output portion 153 of the first content reproduction apparatus 200A generates a streaming signal of the content of the network radio A. The first content reproduction apparatus 200A delivers the streaming signal to the second content reproduction apparatus 200B and the third content reproduction apparatus 200C via the network 300. In each of the second content reproduction apparatus 200B and the third content reproduction apparatus 200C, the control unit 150 receives the streaming signal via the wireless LAN communication unit 156. The control unit 150 instructs the signal output portion 153 to output the streaming signal of the content. The signal output portion 153 of each of the second content reproduction apparatus 200B and the third content reproduction apparatus 200C reproduces the streaming signal of the content of the network radio A without using the buffer 154, and thus the first content reproduction apparatus 200A, the second content reproduction apparatus 200B, and the third content reproduction apparatus 200C perform synchronous reproduction.

Voice Input Step S201

Next, the user says "fourth preset", voices including an operation instruction for restoring the fourth preset are converted into voice data in the voice input apparatus 400, and the voice data is transmitted to the voice recognition apparatus 600. Consequently, the flow returns to voice input step S201.

In the present embodiment, the voice input apparatus 400 adds a user ID allocated to the voice input apparatus 400 to the voice data.

Voice Recognition Step S202

In a case where the voice data is received via the network 300, the voice recognition apparatus 600 performs a voice recognition process, and converts the voice data into data with a format which can be processed in the command processing apparatus 500.

In the present embodiment, the voice recognition apparatus 600 converts the voice data including the operation instruction for restoring the fourth preset into text data with a predetermined format which can be processed in the command processing apparatus 500.

The voice recognition apparatus 600 transmits the text data including the operation instruction for restoring the fourth preset to the command processing apparatus 500 along with the user ID allocated to the voice input apparatus 400.

Synchronous State Acquisition Step S203

The command processing apparatus 500 performs synchronous state acquisition step S203 of acquiring the current synchronous state.

In the present embodiment, the control unit 550 of the command processing apparatus 500 recognizes that the current state is the first preset, a master device is the first content reproduction apparatus 200A, and a slave device is the second content reproduction apparatus 200B and the third content reproduction apparatus 200C, via the network 300.

Synchronous State Comparison Step S204

The command processing apparatus 500 has already received the text data including the operation instruction for restoring the fourth preset from the voice recognition apparatus 600 along with the user ID allocated to the voice input apparatus 400. The command processing apparatus 500 compares the current first preset with the fourth preset to be restored from now on. When comparison between the synchronous states is performed, the command processing apparatus 500 refers to the preset table (FIG. 16) corresponding to the received user ID allocated to the voice input apparatus 400, and acquires information such as a master device, a slave device, the content, and an external input in each preset.

Next, the command processing apparatus 500 compares the synchronous state in the current first preset with a synchronous state in the fourth preset to be restored from now on, and thus recognizes that a master device is the first content reproduction apparatus 200A in the current first preset, but a master device is the second content reproduction apparatus 200B in the fourth preset to be restored from now on. The command processing apparatus 500 recognizes that, with respect to slave devices, the second content reproduction apparatus 200B and the third content reproduction apparatus 200C are included as slave devices in the current first preset, but, in the fourth preset to be restored from now on, the third content reproduction apparatus 200C is continuously included as a slave device, and the second content reproduction apparatus 200B is not included as a slave device, and, instead, the fourth content reproduction apparatus 200D is included as a slave device.

Synchronous State Cancel Step S205

The control unit 550 of the command processing apparatus 500 transmits a synchronous state cancel signal for canceling the current synchronous state including a content reproduction apparatus common to a content reproduction apparatus included in a synchronous state which is selected and is to be restored. In the present embodiment, the second content reproduction apparatus 200B and the third content reproduction apparatus 200C are included in common between the synchronous state in the current first preset and the synchronous state in the fourth preset to be restored, and a synchronous state cancel signal for canceling the current synchronous state is transmitted. Synchronous states of all content reproduction apparatuses included in the current synchronous state may be canceled by using the synchronous state cancel signal, but a synchronous state of a common content reproduction apparatus may be maintained, and a synchronous state of only a content reproduction apparatus included in the current synchronous state and not included in a synchronous state to be restored may be canceled.

In the present embodiment, in the fourth preset to be restored, a master device is changed from the first content reproduction apparatus 200A to the second content reproduction apparatus 200B, and thus a synchronous state cancel signal for canceling the current synchronous state is transmitted to the first content reproduction apparatus 200A which is a master device in the current state. The first content reproduction apparatus 200A having received the synchronous state cancel signal stops to transmit a streaming signal generated thereby to the second content reproduction apparatus 200B and the third content reproduction apparatus 200C which are slave devices in the current state.

The voice input apparatus 400 may acquire information indicating that the synchronous state in which the first content reproduction apparatus 200A is a master device is canceled via the network 300, and the display unit 10 of the voice input apparatus 400 may display the user interface as illustrated in FIG. 12. In other words, the display unit 10 displays information regarding each content reproduction apparatus separately.

In the present embodiment, in the fourth preset to be restored from now on, the content to be reproduced is TV distribution using an external input, and reproduction thereof is different from reproduction of the content of the current network radio A, and thus the control unit 550 of the command processing apparatus 500 transmits to the first content reproduction apparatus 200A a command for stopping reproduction of the content of the network radio A in the current first content reproduction apparatus 200A.

The first content reproduction apparatus 200A is not included in the fourth preset to be restored from now on, and thus the first content reproduction apparatus 200A may continuously reproduce the content of the network radio A. In other words, the command processing apparatus 500 may not transmit a command for stopping content reproduction to the first content reproduction apparatus 200A.

Preset Restoring Step S206

The control unit 550 of the command processing apparatus 500 restores the fourth preset selected by the user. In the present embodiment, the control unit 550 of the command processing apparatus 500 transmits a master device setting signal to the second content reproduction apparatus 200B, and transmits a slave device setting signal to the third content reproduction apparatus 200C and the fourth content reproduction apparatus 200D.

The voice input apparatus 400 may acquire information indicating that a synchronous state in the fourth preset in which the second content reproduction apparatus 200B is set as a master device is restored via the network 300, and the display unit 10 of the voice input apparatus 400 may display the user interface as illustrated in FIG. 13. In other words, the display unit 10 displays information indicating that a master device is the second content reproduction apparatus 200B, the third content reproduction apparatus 200C and the fourth content reproduction apparatus 200D disposed in two other rooms are slave devices, and the fourth preset is currently restored.

In order to restore the fourth preset, the control unit 550 transmits a command signal for instructing the second content reproduction apparatus 200B to acquire TV content via an external input terminal, generate a streaming signal, and transmit the streaming signal to the third content reproduction apparatus 200C and the fourth content reproduction apparatus 200D.

The wireless LAN communication unit 156 of the second content reproduction apparatus 200B receives the command signal. The control unit 150 of the second content reproduction apparatus 200B acquires the TV content via the external input terminal, and instructs the signal output portion 153 to reproduce the content. The signal output portion 153 of the second content reproduction apparatus 200B reproduces the TV content via the buffer 154. Simultaneously, the signal output portion 153 of the second content reproduction apparatus 200B generates a streaming signal of the TV content. The second content reproduction apparatus 200B delivers the streaming signal to the third content reproduction apparatus 200C and the fourth content reproduction apparatus 200D via the network 300. In each of the third content reproduction apparatus 200C and the fourth content reproduction apparatus 200D, the control unit 150 receives the streaming signal via the wireless LAN communication unit 156. The control unit 150 instructs the signal output portion 153 to output the streaming signal of the content. The signal output portion 153 of each of the third content reproduction apparatus 200C and the fourth content reproduction apparatus 200D reproduces the streaming signal of the TV content without using the buffer 154, and thus the second content reproduction apparatus 200B, the third content reproduction apparatus 200C, and the fourth content reproduction apparatus 200D perform synchronous reproduction.

Regarding a reproduction volume in each content reproduction apparatus, the storage unit 560 of the command processing apparatus 500 may store a predetermined volume value for each preset, and thus a reproduction volume value in all content reproduction apparatuses included in a single preset may be constant, and the storage unit 560 may store a separate volume value in each content reproduction apparatus in each preset.

In the present embodiment, a description has been made of a configuration in which the voice input apparatus 400 adds a user ID to voice data, and transmits the voice data to the voice recognition apparatus 600, but the voice input apparatus 400 may transmit the voice data to the voice recognition apparatus 600 without adding the user ID thereto. In this case, for example, the voice recognition apparatus 600 may perform voice recognition on voice data by using a voiceprint or the like of a user so as to add a user ID to the voice data. Alternatively, there may be a configuration in which the user performs voice input including a user name thereof, for example, voice input such as "reproduce the first preset of the user A" on the voice input apparatus 400, and the voice recognition apparatus 600 having received voice data from the voice input apparatus 400 converts the voice data such as "the user A" into a user ID. Alternatively, the command processing apparatus 500 may convert text data such as "the user A" transmitted from the voice recognition apparatus 600 into a user ID.

A synchronous state among a plurality of content reproduction apparatuses in the present embodiment may be a synchronous state formed by a master device delivering a streaming signal of the content to a slave device, and may also be a synchronous state formed by the command processing apparatus 500 directly instructing the plurality of content reproduction apparatuses to reproduce the content.

The synchronous state in the present disclosure is not limited to a state in which content reproduction timings completely match each other among a plurality of content reproduction apparatuses, and also includes a state in which slight delay occurs due to network delay or the like in one content reproduction apparatus and thus a reproduction timing is slightly deviated.

In the above description, a description has been made of an example in which the voice recognition apparatus 600 and the command processing apparatus 500 are disposed on the wide area side, but there may be a configuration in which the voice recognition apparatus 600 and the command processing apparatus 500 are disposed in the same local area as the voice input apparatus 400, the first content reproduction apparatus 200A, the second content reproduction apparatus 200B, the third content reproduction apparatus 200C, and the fourth content reproduction apparatus 200D, and perform transmission and reception of signals via a LAN or the like.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A control method of an operation apparatus, comprising:
    acquiring a current synchronous state of a first plurality of content reproduction apparatuses, the current synchronous state indicating a master and slave relationship among the first plurality of content reproduction apparatuses;
    receiving selection of a preset from among a plurality of presets, set in advance, regarding a synchronous state of a second plurality of content reproduction apparatuses, the synchronous state of the second plurality of content reproduction apparatuses indicating a master and slave relationship among the second plurality of content reproduction apparatuses;
    comparing the acquired current synchronous state of the first plurality of content reproduction apparatuses indicating the master and slave relationship among the first plurality of content reproduction apparatuses with the synchronous state of the second plurality of content reproduction apparatuses indicating the master and slave relationship among the second plurality of content reproduction apparatuses and included in the selected preset;
    generating a synchronous state cancel signal based on a result of the comparing of the acquired current synchronous state of the first plurality of content reproduction apparatuses indicating the master and slave relationship among the first plurality of content reproduction apparatuses with the synchronous state of the second plurality of content reproduction apparatuses indicating the master and slave relationship among the second plurality of content reproduction apparatuses and included in the selected preset;
    transmitting the synchronous state cancel signal for canceling a current synchronous state of at least some of the first plurality of content reproduction apparatuses, the current synchronous state of the at least some of the first plurality of content reproduction apparatuses indicating a master and slave relationship among the at least some of the first plurality of content reproduction apparatuses; and
    transmitting a preset setting signal to at least one content reproduction apparatus among the second plurality of content reproduction apparatuses so as to set the synchronous state of the second plurality of content reproduction apparatuses according to the selected preset.

2. The control method according to claim 1,
wherein the synchronous state cancel signal cancels a current synchronous state of a content reproduction apparatus that is included among both the first plurality of content reproduction apparatuses and the second plurality of content reproduction apparatuses.

3. The control method according to claim 1,
wherein the synchronous state cancel signal cancels current synchronous states of all of the first plurality of content reproduction apparatuses.

4. The control method according to claim 1,
wherein the synchronous state cancel signal cancels synchronous states of all of the second plurality of content reproduction apparatuses included in the selected preset.

5. The control method according to claim 1,
wherein the synchronous state cancel signal is transmitted to a content reproduction apparatus among the first plurality of content reproduction apparatuses that is designated as a master device in the selected preset.

6. The control method according to claim 1,
wherein the synchronous state cancel signal is transmitted to all of the second plurality of content reproduction apparatuses included in the selected preset.

7. The control method according to claim 1,
wherein the synchronous state cancel signal is transmitted to a content reproduction apparatus of which the synchronous state is canceled.

8. The control method according to claim 1,
wherein in a case where a first content reproduction apparatus, which is included among both the first plurality of content reproduction apparatuses and the second plurality of content reproduction apparatuses, has a current synchronous state that is the same as a synchronous state in the selected preset, the synchronous state cancel signal is not transmitted to the first content reproduction apparatus.

9. The control method according to claim 1,
wherein, in a case where a power source of a content reproduction apparatus among the second plurality of content reproduction apparatuses included in the selected preset is in an OFF state, a command signal for turning on the power source of the content reproduction apparatus is transmitted before the preset setting signal is transmitted.

10. The control method according to claim 9,
wherein the command signal for turning on the power source is transmitted to only the content reproduction apparatus of which the power source is in an OFF state, or to all content reproduction apparatuses among the second plurality of content reproduction apparatuses included in the selected preset.

11. The control method according to claim 1,
wherein the preset setting signal includes a master device setting signal for instructing a master device to be set among the second plurality of content reproduction apparatuses included in the selected preset and a slave device setting signal for instructing a slave device to be set among the second plurality of content reproduction apparatuses included in the selected preset.

12. The control method according to claim 1, further comprising:
    checking that the selected preset is built after the transmitting the preset setting signal; and transmitting a command signal regarding content reproduction after the checking.

13. The control method according to claim 1, further comprising:
obtaining a time required for a content reproduction apparatus included in the selected preset to restore the selected preset once the preset setting signal has been transmitted, and
transmitting a command signal regarding content reproduction after the obtained time elapses.

14. The control method according to claim 1, further comprising:
transmitting a command signal for stopping reproduction of content reproduced by a master device among the second plurality of content reproduction apparatuses included in the selected preset to the master device before the transmitting the preset setting signal.

15. The control method according to claim 1,
wherein a content reproduction apparatus, among the second plurality of content reproduction apparatuses, includes a first route for amplifying an output signal from a signal output portion via a buffer and a second route for amplifying the output signal from the signal output portion without passing through the buffer, and
wherein the content reproduction apparatus, among the second plurality of content reproduction apparatuses, that receives the preset setting signal, receives an audio signal from a master device, and performs synchronous reproduction is configured to amplify the output signal from the signal output portion via the second route.

16. A control method of a command processing apparatus comprising:
acquiring a current synchronous state of a first plurality of content reproduction apparatuses, the current synchronous state indicating a master and slave relationship among the first plurality of content reproduction apparatuses;
acquiring voice data that indicates a selection of a preset from among a plurality of presets, set in advance, regarding a synchronous state of a second plurality of content reproduction apparatuses, the synchronous state of the second plurality of content reproduction apparatuses indicating a master and slave relationship among the second plurality of content reproduction apparatuses;
comparing the acquired current synchronous state of the first plurality of content reproduction apparatuses indicating the master and slave relationship among the first plurality of content reproduction apparatuses with the synchronous state of the second plurality of content reproduction apparatuses indicating the master and slave relationship among the second plurality of content reproduction apparatuses and included in the selected preset;
generating a synchronous state cancel signal based on a result of the comparing of the acquired current synchronous state of the first plurality of content reproduction apparatuses indicating the master and slave relationship among the first plurality of content reproduction apparatuses with the synchronous state of the second plurality of content reproduction apparatuses indicating the master and slave relationship among the second plurality of content reproduction apparatuses and included in the selected preset;
transmitting the synchronous state cancel signal for canceling a current synchronous state of at least some of the first plurality of content reproduction apparatuses, the current synchronous state of the at least some of the first plurality of content reproduction apparatuses indicating a master and slave relationship among the at least some of the first plurality of content reproduction apparatuses; and
transmitting a preset setting signal to at least one content reproduction apparatus among the second plurality of content reproduction apparatuses so as to set the synchronous state of the second plurality of content reproduction apparatuses according to the preset selected in the voice data.

17. The control method according to claim 16, further comprising:
performing voice recognition on the acquired voice data; and
generating the preset setting signal according to a result of the voice recognition.

18. A control method of a content reproduction system including a voice input apparatus and a command processing apparatus, the method comprising:
acquiring a current synchronous state of a first plurality of content reproduction apparatuses, the current synchronous state indicating a master and slave relationship among the first plurality of content reproduction apparatuses;
generating voice data by the voice input apparatus;
acquiring the generated voice data that indicates a selection of a preset from among a plurality of presets, set in advance, regarding a synchronous state of a second plurality of content reproduction apparatuses, the synchronous state of the second plurality of content reproduction apparatuses indicating a master and slave relationship among the second plurality of content reproduction apparatuses;
comparing the acquired current synchronous state of the first plurality of content reproduction apparatuses indicating the master and slave relationship among the first plurality of content reproduction apparatuses with the synchronous state of the second plurality of content reproduction apparatuses indicating the master and slave relationship among the second plurality of content reproduction apparatuses and included in the selected preset;
generating a synchronous state cancel signal based on a result of the comparing of the acquired current synchronous state of the first plurality of content reproduction apparatuses indicating the master and slave relationship among the first plurality of content reproduction apparatuses with the synchronous state of the second plurality of content reproduction apparatuses indicating the master and slave relationship among the second plurality of content reproduction apparatuses and included in the selected preset;
transmitting the synchronous state cancel signal for canceling a current synchronous state of at least some of the first plurality of content reproduction apparatuses, the current synchronous state of the at least some of the first plurality of content reproduction apparatuses indicating a master and slave relationship among the at least some of the first plurality of content reproduction apparatuses; and
transmitting a preset setting signal to at least one content reproduction apparatus among the second plurality of content reproduction apparatuses so as to set the synchronous state of the second plurality of content reproduction apparatuses according to the preset selected in the acquired voice data.

19. The control method according to claim 18, further comprising:
   converting a format of the voice data generated by the voice input apparatus; and
   transmitting the voice data having the converted format to the command processing apparatus.

\* \* \* \* \*